United States Patent
Francini et al.

(10) Patent No.: US 11,677,666 B2
(45) Date of Patent: Jun. 13, 2023

(54) APPLICATION-BASED QUEUE MANAGEMENT

(71) Applicant: Nokia Solutions and Networks Oy, Espoo (FI)

(72) Inventors: Andrea Francini, Rumson, NJ (US); Koen De Schepper, Boortmeerbeek (BE); Olivier Tilmans, Woluwe-Saint-Lambert (BE); Sameerkumar Sharma, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 185 days.

(21) Appl. No.: 16/599,592

(22) Filed: Oct. 11, 2019

(65) Prior Publication Data
US 2021/0112006 A1   Apr. 15, 2021

(51) Int. Cl.
*H04L 47/11* (2022.01)
*H04L 69/22* (2022.01)
*H04L 47/35* (2022.01)
*H04L 47/2441* (2022.01)

(52) U.S. Cl.
CPC ........ *H04L 47/115* (2013.01); *H04L 47/2441* (2013.01); *H04L 47/35* (2013.01); *H04L 69/22* (2013.01)

(58) Field of Classification Search
CPC ... H04L 1/1835; H04L 29/0653; H04L 47/10; H04L 47/11; H04L 47/115; H04L 47/12; H04L 47/2441; H04L 47/32; H04L 47/35; H04L 49/90; H04L 49/9005;
(Continued)

(56) References Cited

U.S. PATENT DOCUMENTS

| 7,583,677 B1 * | 9/2009 | Ma | H04L 45/00 370/235 |
| 7,664,048 B1 * | 2/2010 | Yung | H04L 47/36 370/253 |
| 9,374,325 B2 | 6/2016 | McKenney | |

(Continued)

FOREIGN PATENT DOCUMENTS

WO   WO 2019/054984   3/2019

OTHER PUBLICATIONS

Ramakrishnan, K., et al., "The Addition of Explicit Congestion Notification (ECN) to IP," IETF, Network Working Group, RFC 3168, Sep. 2001.

(Continued)

*Primary Examiner* — Kan Yuen
(74) *Attorney, Agent, or Firm* — Tong, Rea, Bentley & Kim, LLC

(57) ABSTRACT

Various example embodiments for supporting queue management in communication systems are presented. Various example embodiments for supporting queue management in communication systems may be configured to support application-based queue management. Various example embodiments for supporting application-based queue management may be configured to support application-based congestion control. Various example embodiments for supporting application-based congestion control may be configured to support application-based congestion control based on use of trigger templates.

18 Claims, 12 Drawing Sheets

(58) Field of Classification Search
CPC ............ H04L 49/9036; H04L 63/1408; H04L 63/1416; H04L 69/22

See application file for complete search history.

(56) References Cited

U.S. PATENT DOCUMENTS

| | | | | |
|---|---|---|---|---|
| 2005/0129044 | A1* | 6/2005 | Katayama | H04L 47/30 370/412 |
| 2007/0076604 | A1* | 4/2007 | Litwack | H04L 47/266 370/230 |
| 2013/0343398 | A1* | 12/2013 | Sarca | H04L 47/32 370/412 |
| 2019/0012278 | A1* | 1/2019 | Sindhu | H04L 12/56 |
| 2020/0351211 | A1* | 11/2020 | Kunz | H04L 61/103 |
| 2021/0021545 | A1* | 1/2021 | Srivastava | H04L 47/12 |

OTHER PUBLICATIONS

De Schepper, K., et al., "Identifying Modified Explicit Congestion Notification (ECN) Semantics for Ultra-Low Queuing Delay (L4S)," IETF, Transport Services, Internet Draft, draft-ietf-tsvwg-ecn-l4s-id-06, Mar. 11, 2019, 40 pages.

Kohler, E., et al., "Datagram Congestion Control Protocol (DCCP)," IETF, Network Working Group, RFC 4340, Mar. 2006, 129 pages.

Stewart, R., "Stream Control Transmission Protocol," IETF, Network Working Group, RFC 4960, Sep. 2007, 152 pages.

Iyenger, J., et al., "QUIC: A UDP-Based Multiplexed and Secure Transport," IETF, QUIC, Internet Draft, draft-ietf-quic-transport-20, Apr. 23, 2019, 143 pages.

Holmer, S., et al., "A Google Congestion Control Algorithm for Real-Time Communication," IETF, Network Working Group, Internet Draft, draft-alvestrand-rmcat-congestion-03, Jun. 29, 2015, 19 pages.

Johansson, I., "Self-Clocked Rate Adaptation for Multimedia," Internet Engineering Task Force (IETF), RFC 8298, Dec. 2017, 36 pages.

Lu, F., et al., "CQIC: Revisiting Cross-Layer Congestion Control for Cellular Networks," Proceedings of the 16th International Workshop on Mobile Computing Systems and Applications (HotMobile '15), Santa Fe, NM, Feb. 12-13, 2015, 6 pages.

Jain, A., et la., "Mobile Throughput Guidance Inband Signaling Protocol," Internet Engineering Task Force, Internet Draft, draft-flinck-mobile-throughput-guidance-04.txt, Mar. 13, 2017, 16 pages.

Ait-Hellal, O., et al., "Analysis of TCP Vegas and TCP Reno," Proceedings of IEEE International Conference on Communications (ICC '97), Montreal (Canada), Jun. 1997, pp. 495-499.

Ha, S., et al., "CUBIC: A New TCP-Friendly High-Speed TCP Variant," ACM SIGOPS Operating Systems Review, vol. 42, Issue 5, Jul. 2008, pp. 64-74.

Gerla, M., et al., "TCP Westwood: Congestion Window Control Using Bandwidth Estimation," Proceedings of IEEE 2001 Global Telecommunications Conference (GLOBECOM '01), San Antonio, TX, Nov. 2001, 8 pages.

Wei, E., et al., "Fast TCP: Motivation, Architecture, Algorithms, and Performance," IEEE/ACM Transactions on Networking, vol. 14, No. 6., Dec. 2006, pp. 1246-1259.

Tan, K., et al., "A Compound TCP Approach for High-speed and Long Distance Networks," Proceedings of IEEE 25th International Conference on Computer Communications (INFOCOM '06), Barcelona, Spain, Apr. 2006, 12 pages.

Alizadeh, M., et al., "Data Center TCP (DCTCP)," Proceedings of ACM 2010 SIGCOMM Conference on Applications, Technologies, Architectures, and Protocols for Computer Communications (SIGCOMM '10), New Delhi, India, Sep. 3, 2010, 12 pages.

Floyd, S., et al., "Random Early Detection Gateways for Congestion Avoidance," IEEE/ACM Transactions on Networking, vol. 1, Issue 3, Aug. 1993, pp. 397-413.

Nichols, K., et al., "Controlling Queue Delay," ACM Queue, vol. 10, Issue 5, May 2012, pp. 20-34.

Pan, R., et al., "PIE: A Lightweight Control Scheme to Address the Bufferbloat Problem," 2013 Proceedings of IEEE 14th International Conference on High Performance Switching and Routing (HPSR '13), Taipei, Taiwan, Jul. 8-11, 2013, pp. 148-155.

McKenney, P., "Stochastic Fairness Queuing," in Proc. of IEEE Infocom '90, Jun. 3-7, 1990, 8 pages.

Hoeiland-Joergensen, T., et al., "The Flow Queue CoDel Packet Scheduler and Active Queue Management Algorithm," Internet Engineering Task Force (IETF), RFC 8290, Jan. 2018, 25 pages.

White, G., et al., "Active Queue Management (AQM) Based on Proportional Integral Controller Enhanced (PIE) for Data-Over-Cable Service Interface Specifications (DOCSIS) Cable Modems," Internet Engineering Task Force (IETF), RFC 8034, Feb. 2017, 17 pages.

bufferbloat.net, "Cake—Common Applications Kept Enhanced," retrieved from www.bufferbloat.net/prjects/codel/wiki/cake, 12 pages, printed on Oct. 14, 2019.

Cisco Systems, "Class-Based Weighted Fair Queueing and Weighted Random Early Detection," Cisco, <http://www.cisco.com/c/en/us/td/docs/ios/12_0s/feature/guide/fswfq26.html>, printed on Oct. 14, 2019. 44 pages.

Heinanen, J., et al., "A Single Rate Three Color Marker," IETF, Network Working Group, RFC 2697, Sep. 1999, 6 pages.

Heinanen, J. et al., "A Two Rate Three Color Marker," IETF, Network Working Group, RFC 2698, Sep. 1999, 5 pages.

Briscoe, B., et al., "Low Latency, Low Loss, Scalable Throughput (L4S) Internet Service: Architecture," IETF, Transport Area Working Group, Internet Draft, draft-ietf-tsvwg-l4s-arch-03, Oct. 22, 2018, 32 pages.

De Schepper, K., et al., "DualQ Coupled AQMs for Low Latency, Low Loss and Scalable Throughput (L4S)," Ietf, Transport Area Working Group, Internet Draft, draft-ietf-tsvwg-aqm-dualq-coupled-08, Nov. 4, 2018, 41 pages.

* cited by examiner

APPLICATION-BASED QUEUE MANAGEMENT

TECHNICAL FIELD

Various example embodiments relate generally to communication systems, more particularly but not exclusively, to supporting congestion control in communication systems.

BACKGROUND

Communication networks, which may support transport of packets for various purposes, may experience congestion for various reasons. Many communication networks employ various congestion control capabilities for attempting to prevent congestion before the congestion occurs or for attempting to mitigate congestion after the congestion occurs.

SUMMARY

In at least some example embodiments, an apparatus includes at least one processor and at least one memory including program code, wherein the at least one memory and the program code are configured to, with the at least one processor, cause the apparatus to at least identify, for a packet associated with a flow queue of a link buffer, a trigger template configured to support application-based congestion control at the link buffer and determine, based on the trigger template, whether to perform application-based congestion control for the flow queue of the link buffer. In at least some example embodiments, the trigger template is associated with an application type or an application. In at least some example embodiments, the trigger template is identified from a set of trigger templates based on the packet. In at least some example embodiments, the trigger template is identified from the set of trigger templates based on one or more header fields of the packet. In at least some example embodiments, the set of trigger templates includes a default trigger template to be applied for packets that do not match any other trigger template in the set of trigger templates. In at least some example embodiments, the trigger template is identified based on storage of the packet in the flow queue in conjunction with arrival of the packet to the link buffer. In at least some example embodiments, the trigger template is identified by an input handler associated with a set of flow queues including the flow queue. In at least some example embodiments, the trigger template is identified based on removal of the packet from the flow queue by a flow scheduler of the link buffer. In at least some example embodiments, the trigger template is identified by an output handler associated with a set of flow queues including the flow queue. In at least some example embodiments, the trigger template is identified by a packet handler of a class queue to which the flow queue belongs. In at least some example embodiments, the packet handler is an input handler associated with storage of the packet in the flow queue in conjunction with arrival of the packet to the link buffer or an output handler associated with removal of the packet from the flow queue by a flow scheduler of the link buffer. In at least some example embodiments, the trigger template includes a congestion control condition and a congestion control action to be performed based on a determination that the congestion control condition is satisfied. In at least some example embodiments, the congestion control action is based on at least one of information from the packet or state information from the flow queue. In at least some example embodiments, the congestion control action includes one or more of dropping the packet, initiating in-band congestion control signaling, initiating out-of-band congestion control signaling, or modifying one or more state indicators of one or more flow queues. In at least some example embodiments, to determine whether to perform application-based congestion control for the flow queue of the link buffer, the at least one memory and the program code are configured to, with the at least one processor, cause the apparatus to at least perform an evaluation of the congestion control condition of the trigger template and determine, based on the evaluation of the congestion control condition of the trigger template, whether to initiate the congestion control action of the trigger template. In at least some example embodiments, the congestion control condition is evaluated based on information from the packet. In at least some example embodiments, the congestion control condition is evaluated based on state information received from the flow queue. In at least some example embodiments, the trigger template is identified based on storage of the packet in the flow queue in conjunction with arrival of the packet to the link buffer, wherein the state information received from the flow queue includes a queue length of the flow queue. In at least some example embodiments, the trigger template is identified based on removal of the packet from the flow queue by a flow scheduler of the link buffer, wherein the state information received from the flow queue includes a queuing latency of the flow queue. In at least some example embodiments, the at least one memory and the program code are configured to, with the at least one processor, cause the apparatus to at least initiate, based on a determination to perform application-based congestion control for the flow queue, a congestion control action configured to provide congestion control for the flow queue. In at least some example embodiments, the at least one memory and the program code are configured to, with the at least one processor, cause the apparatus to at least prevent, based on a determination not to perform application-based congestion control for the flow queue, initiation of a congestion control action configured to provide congestion control for the flow queue. In at least some example embodiments, association of the packet with the flow queue is based on stochastic fairness queueing (SFQ). In at least some example embodiments, the at least one memory and the program code are configured to, with the at least one processor, cause the apparatus to at least update the trigger template based on a management interface between a management element and a packet handler configured to control application of the trigger template to packets based on queuing of the packets at the link buffer. In at least some example embodiments, the at least one memory and the program code are configured to, with the at least one processor, cause the apparatus to at least perform congestion control at the link buffer based on an overall occupancy of the link buffer.

In at least some example embodiments, a non-transitory computer-readable medium includes instructions configured to cause an apparatus to at least identify, for a packet associated with a flow queue of a link buffer, a trigger template configured to support application-based congestion control at the link buffer and determine, based on the trigger template, whether to perform application-based congestion control for the flow queue of the link buffer. In at least some example embodiments, the trigger template is associated with an application type or an application. In at least some example embodiments, the trigger template is identified from a set of trigger templates based on the packet. In at least some example embodiments, the trigger template is identified from the set of trigger templates based on one or more header fields of the packet. In at least some example embodiments, the set of trigger templates includes a default trigger template to be applied for packets that do not match any other trigger template in the set of trigger templates. In at least some example embodiments, the trigger template is identified based on storage of the packet in the flow queue in conjunction with arrival of the packet to the link buffer. In at least some example embodiments, the trigger template is identified by an input handler associated with a set of flow queues including the flow queue. In at least some example embodiments, the trigger template is identified based on removal of the packet from the flow queue by a flow scheduler of the link buffer. In at least some example embodiments, the trigger template is identified by an output handler associated with a set of flow queues including the flow queue. In at least some example embodiments, the trigger template is identified by a packet handler of a class queue to which the flow queue belongs. In at least some example embodiments, the packet handler is an input handler associated with storage of the packet in the flow queue in conjunction with arrival of the packet to the link buffer or an output handler associated with removal of the packet from the flow queue by a flow scheduler of the link buffer. In at least some example embodiments, the trigger template includes a congestion control condition and a congestion control action to be performed based on a determination that the congestion control condition is satisfied. In at least some example embodiments, the congestion control action is based on at least one of information from the packet or state information from the flow queue. In at least some example embodiments, the congestion control action includes one or more of dropping the packet, initiating in-band congestion control signaling, initiating out-of-band congestion control signaling, or modifying one or more state indicators of one or more flow queues. In at least some example embodiments, to determine whether to perform application-based congestion control for the flow queue of the link buffer, the non-transitory computer-readable medium includes instructions configured to cause the apparatus to at least perform an evaluation of the congestion control condition of the trigger template and determine, based on the evaluation of the congestion control condition of the trigger template, whether to initiate the congestion control action of the trigger template. In at least some example embodiments, the congestion control condition is evaluated based on information from the packet. In at least some example embodiments, the congestion control condition is evaluated based on state information received from the flow queue. In at least some example embodiments, the trigger template is identified based on storage of the packet in the flow queue in conjunction with arrival of the packet to the link buffer, wherein the state information received from the flow queue includes a queue length of the flow queue. In at least some example embodiments, the trigger template is identified based on removal of the packet from the flow queue by a flow scheduler of the link buffer, wherein the state information received from the flow queue includes a queuing latency of the flow queue. In at least some example embodiments, the non-transitory computer-readable medium includes instructions configured to cause the apparatus to at least initiate, based on a determination to perform application-based congestion control for the flow queue, a congestion control action configured to provide congestion control for the flow queue. In at least some example embodiments, the non-transitory computer-readable medium includes instructions configured to cause the apparatus to at least prevent, based on a determination not to perform application-based congestion control for the flow queue, initiation of a congestion control action configured to provide congestion control for the flow queue. In at least some example embodiments, association of the packet with the flow queue is based on stochastic fairness queueing (SFQ). In at least some example embodiments, the non-transitory computer-readable medium includes instructions configured to cause the apparatus to at least update the trigger template based on a management interface between a management element and a packet handler configured to control application of the trigger template to packets based on queuing of the packets at the link buffer. In at least some example embodiments, the non-transitory computer-readable medium includes instructions configured to cause the apparatus to at least perform congestion control at the link buffer based on an overall occupancy of the link buffer.

In at least some example embodiments, a method includes identifying, for a packet associated with a flow queue of a link buffer, a trigger template configured to support application-based congestion control at the link buffer and determining, based on the trigger template, whether to perform application-based congestion control for the flow queue of the link buffer. In at least some example embodiments, the trigger template is associated with an application type or an application. In at least some example embodiments, the trigger template is identified from a set of trigger templates based on the packet. In at least some example embodiments, the trigger template is identified from the set of trigger templates based on one or more header fields of the packet. In at least some example embodiments, the set of trigger templates includes a default trigger template to be applied for packets that do not match any other trigger template in the set of trigger templates. In at least some example embodiments, the trigger template is identified based on storage of the packet in the flow queue in conjunction with arrival of the packet to the link buffer. In at least some example embodiments, the trigger template is identified by an input handler associated with a set of flow queues including the flow queue. In at least some example embodiments, the trigger template is identified based on removal of the packet from the flow queue by a flow scheduler of the link buffer. In at least some example embodiments, the trigger template is identified by an output handler associated with a set of flow queues including the flow queue. In at least some example embodiments, the trigger template is identified by a packet handler of a class queue to which the flow queue belongs. In at least some example embodiments, the packet handler is an input handler associated with storage of the packet in the flow queue in conjunction with arrival of the packet to the link buffer or an output handler associated with removal of the packet from the flow queue by a flow scheduler of the link buffer. In at least some example embodiments, the trigger template includes a congestion control condition and a congestion control action to be performed based on a determination that the congestion control condition is satisfied. In at least some example embodiments, the congestion control action is based on at least one of information from the packet or state information from the flow queue. In at least some example embodiments, the congestion control action includes one or more of dropping the packet, initiating in-band congestion control signaling, initiating out-of-band congestion control signaling, or modifying one or more state indicators of one or more flow queues. In at least some example embodiments, determining whether to perform application-based congestion control for the flow queue of the link buffer includes performing an evaluation of the congestion control condition of the trigger template and determining, based on the evaluation of the congestion control condition of the trigger template, whether to initiate the congestion control action of the trigger template. In at least some example embodiments, the congestion control condition is evaluated based on information from the packet. In at least some example embodiments, the congestion control condition is evaluated based on state information received from the flow queue. In at least some example embodiments, the trigger template is identified based on storage of the packet in the flow queue in conjunction with arrival of the packet to the link buffer, wherein the state information received from the flow queue includes a queue length of the flow queue. In at least some example embodiments, the trigger template is identified based on removal of the packet from the flow queue by a flow scheduler of the link buffer, wherein the state information received from the flow queue includes a queuing latency of the flow queue. In at least some example embodiments, the method includes initiating, based on a determination to perform application-based congestion control for the flow queue, a congestion control action configured to provide congestion control for the flow queue. In at least some example embodiments, the method includes preventing, based on a determination not to perform application-based congestion control for the flow queue, initiation of a congestion control action configured to provide congestion control for the flow queue. In at least some example embodiments, association of the packet with the flow queue is based on stochastic fairness queueing (SFQ). In at least some example embodiments, the method includes updating the trigger template based on a management interface between a management element and a packet handler configured to control application of the trigger template to packets based on queuing of the packets at the link buffer. In at least some example embodiments, the method includes performing congestion control at the link buffer based on an overall occupancy of the link buffer.

In at least some example embodiments, an apparatus includes means for identifying, for a packet associated with a flow queue of a link buffer, a trigger template configured to support application-based congestion control at the link buffer and means for determining, based on the trigger template, whether to perform application-based congestion control for the flow queue of the link buffer. In at least some example embodiments, the trigger template is associated with an application type or an application. In at least some example embodiments, the trigger template is identified from a set of trigger templates based on the packet. In at least some example embodiments, the trigger template is identified from the set of trigger templates based on one or more header fields of the packet. In at least some example embodiments, the set of trigger templates includes a default trigger template to be applied for packets that do not match any other trigger template in the set of trigger templates. In at least some example embodiments, the trigger template is identified based on storage of the packet in the flow queue in conjunction with arrival of the packet to the link buffer. In at least some example embodiments, the trigger template is identified by an input handler associated with a set of flow queues including the flow queue. In at least some example embodiments, the trigger template is identified based on removal of the packet from the flow queue by a flow scheduler of the link buffer. In at least some example embodiments, the trigger template is identified by an output handler associated with a set of flow queues including the flow queue. In at least some example embodiments, the trigger template is identified by a packet handler of a class queue to which the flow queue belongs. In at least some example embodiments, the packet handler is an input handler associated with storage of the packet in the flow queue in conjunction with arrival of the packet to the link buffer or an output handler associated with removal of the packet from the flow queue by a flow scheduler of the link buffer. In at least some example embodiments, the trigger template includes a congestion control condition and a congestion control action to be performed based on a determination that the congestion control condition is satisfied. In at least some example embodiments, the congestion control action is based on at least one of information from the packet or state information from the flow queue. In at least some example embodiments, the congestion control action includes one or more of dropping the packet, initiating in-band congestion control signaling, initiating out-of-band congestion control signaling, or modifying one or more state indicators of one or more flow queues. In at least some example embodiments, determining whether to perform application-based congestion control for the flow queue of the link buffer includes performing an evaluation of the congestion control condition of the trigger template and determining, based on the evaluation of the congestion control condition of the trigger template, whether to initiate the congestion control action of the trigger template. In at least some example embodiments, the congestion control condition is evaluated based on information from the packet. In at least some example embodiments, the congestion control condition is evaluated based on state information received from the flow queue. In at least some example embodiments, the trigger template is identified based on storage of the packet in the flow queue in conjunction with arrival of the packet to the link buffer, wherein the state information received from the flow queue includes a queue length of the flow queue. In at least some example embodiments, the trigger template is identified based on removal of the packet from the flow queue by a flow scheduler of the link buffer, wherein the state information received from the flow queue includes a queuing latency of the flow queue. In at least some example embodiments, the apparatus includes means for initiating, based on a determination to perform application-based congestion control for the flow queue, a congestion control action configured to provide congestion control for the flow queue. In at least some example embodiments, the apparatus includes means for preventing, based on a determination not to perform application-based congestion control for the flow queue, initiation of a congestion control action configured to provide congestion control for the flow queue. In at least some example embodiments, association of the packet with the flow queue is based on stochastic fairness queueing (SFQ). In at least some example embodiments, the apparatus includes means for updating the trigger template based on a management interface between a management element and a packet handler configured to control application of the trigger template to packets based on queuing of the packets at the link buffer. In at least some example embodiments, the apparatus includes means for performing congestion control at the link buffer based on an overall occupancy of the link buffer.

In at least some example embodiments, an apparatus includes at least one processor and at least one memory including program code, wherein the at least one memory and the program code are configured to, with the at least one processor, cause the apparatus to at least maintain a link buffer associated with a communication link wherein the link buffer includes a set of flow queues configured to queue packets awaiting transmission via the communication link and maintain a set of trigger templates configured to support application-based congestion control for the flow queues based on queuing of packets at the flow queues. In at least some example embodiments, a non-transitory computer-readable medium includes instructions configured to cause an apparatus to at least maintain a link buffer associated with a communication link wherein the link buffer includes a set of flow queues configured to queue packets awaiting transmission via the communication link and maintain a set of trigger templates configured to support application-based congestion control for the flow queues based on queuing of packets at the flow queues. In at least some example embodiments, a method includes maintaining a link buffer associated with a communication link wherein the link buffer includes a set of flow queues configured to queue packets awaiting transmission via the communication link and maintaining a set of trigger templates configured to support application-based congestion control for the flow queues based on queuing of packets at the flow queues. In at least some example embodiments, an apparatus includes means for maintaining a link buffer associated with a communication link wherein the link buffer includes a set of flow queues configured to queue packets awaiting transmission via the communication link and means for maintaining a set of trigger templates configured to support application-based congestion control for the flow queues based on queuing of packets at the flow queues.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various example embodiments for supporting queue management in communication systems are presented. Various example embodiments for supporting queue management in communication systems may be configured to support application-based queue management. Various example embodiments for supporting application-based queue management may be configured to support application-based queue management based on the application types of the packets, the applications of the packets, or the like, as well as various combinations thereof. Various example embodiments for supporting application-based queue management may be configured to support application-based queue management that includes application-based congestion control. Various example embodiments for supporting application-based queue management, including application-based congestion control, may be configured to support application-based queue management based on use of trigger templates. Various example embodiments for supporting application-based queue management, including application-based congestion control, may be configured to maintain a link buffer associated with a communication link, wherein the link buffer includes a set of flow queues configured to queue packets awaiting transmission via the communication link and maintain a set of trigger templates configured to support application-based congestion control for the flow queues based on queuing of packets at the flow queues. Various example embodiments for supporting application-based queue management, including application-based congestion control, may be configured to identify, for a packet associated with a flow queue of a link buffer, a trigger template configured to support application-based congestion control at the link buffer and determine, based on the trigger template, whether to perform application-based congestion control for the flow queue of the link buffer. It will be appreciated that these and various other example embodiments and advantages or potential advantages of supporting application-based queue management, including application-based congestion control management, in communication systems may be further understood by way of reference to the various figures, which are discussed further below.

Figure 1:
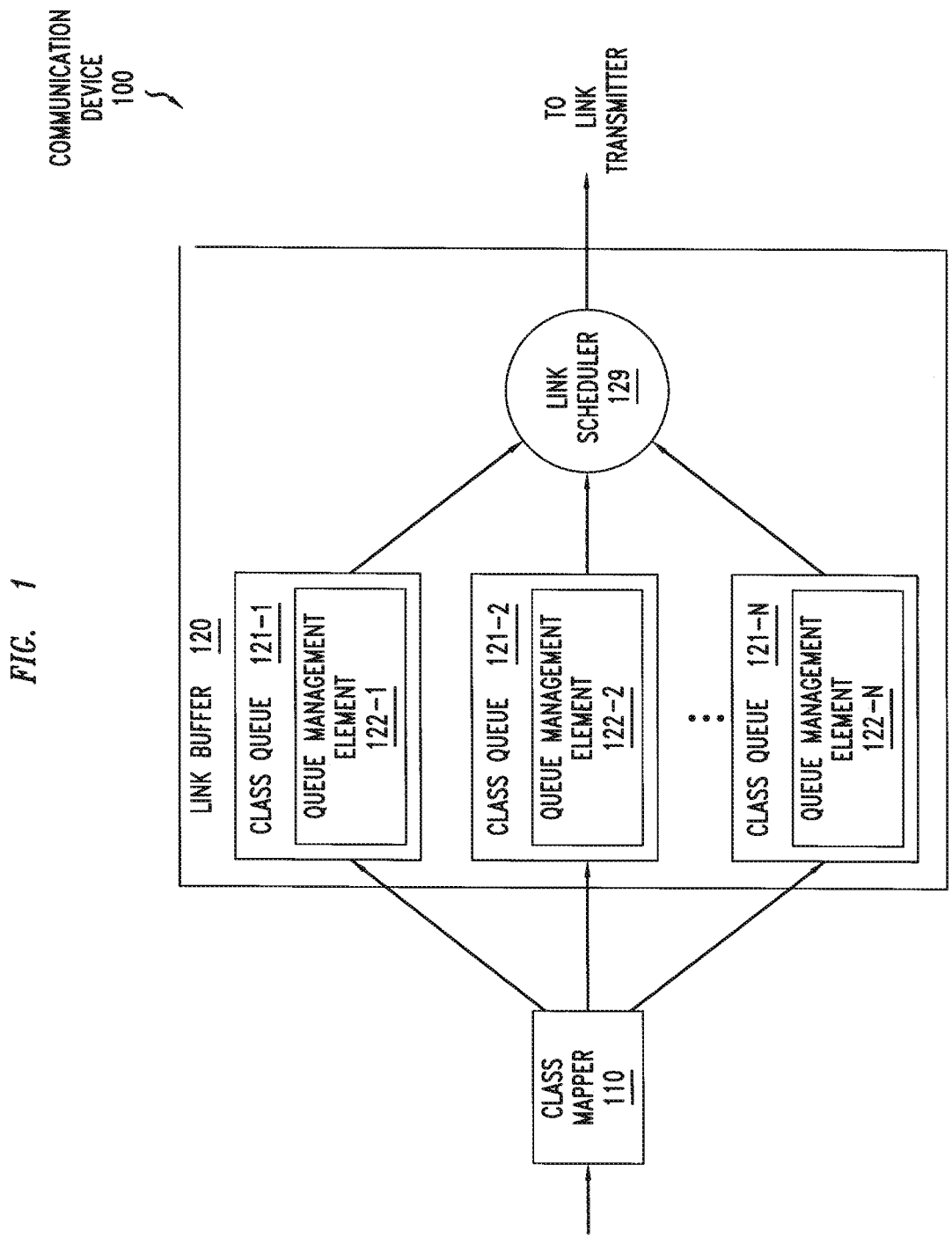
FIG. 1 depicts an example embodiment of a communication device having a link buffer including a set of class queues configured to buffer packets for transmission via a communication link where the class queues of the link buffer are configured to support congestion control using trigger templates.

FIG. 1 depicts an example embodiment of a communication device having a link buffer including a set of class queues configured to buffer packets for transmission via a communication link where the class queues of the link buffer are configured to support congestion control using trigger templates.

The communication device 100 may be any device which may include a link buffer configured to buffer packets for transmission via a communication link. The communication device 100 may be deployed at various locations (e.g., endpoint, access, aggregation, metro, transport, core, or the like) within various types of communication networks (e.g., wireline networks, wireless networks, or the like, as well as various combinations thereof).

The communication device 100 is configured to support queue management for management of packet queuing at the communication device 100.

The communication device 100 is configured to support application-based queue management. The communication device 100 is configured to support application-based queue management for packets that are buffered in front of a network link when the network link is oversubscribed (e.g., when the packet arrival rate is higher than the packet transmission rate). If oversubscription persists, packets accumulate in the link buffer for the network link and the link becomes congested. The longer the duration of the oversubscription condition, the heavier the congestion and its consequences on the performance of the applications whose packets are queued in the link buffer. A large number of packets buffered in front of the link will delay the transmission of packets that arrive next, hindering their respective applications if they rely on the timely delivery of their packets. The communication device 100 is configured to support application-based queue management to manage such conditions and their effects.

The communication device 100 is configured to support application-based queue management that includes application-based congestion control. The communication device 100 is configured to provide application-based queue management, including application-based congestion control, for packets that are buffered in front of a network link when the network link is oversubscribed and congestion results. Congestion control is the networking function in charge of aligning the packet arrival rate with the packet departure rate that the network link can currently sustain, so that applications are not disrupted by excessive levels of queuing delay or packet loss. The function is most effective when the data source and the network link operate in close coordination: namely, when the packet buffer in front of the network link detects congestion and signals an indication of the congestion to the data source and the data source adjusts its packet transmission rate based on the indication of congestion from the packet buffer. Congestion control is important to the operation of most networked applications, especially newer applications that run on untethered devices and that combine interactivity with large data throughput (e.g., augmented reality (AR), virtual reality (VR), or the like). The effective management of packet queues in the buffers of oversubscribed network links is an important component of congestion control solutions. The communication device 100 is configured to support application-based congestion control to manage such congestion and its effects.

The communication device 100 is configured to support queuing of packets and application-based queue management, including application-based congestion control, for packets that are queued at the communication device 100. More specifically, the communication device 100 includes a class mapper 110 and a link buffer 120 that includes a set of class queues 121-1 to 121-N (collectively, class queues 121) and a link scheduler 129. The class mapper 110 receives packets to be transmitted via an outgoing link of the communication device 100 (omitted for purposes of clarity). The packets may be received from an application on the communication device 100 (e.g., where the packet originates on the communication device 100), from a link receiver associated with an incoming link to the communication device 100 (e.g., where the packet is received by the communication device 100), or the like. The class mapper 110 maps the packets to class queues 121. The class queues 121-1 to 121-N include queue management elements 122-1 to 122-N (collectively, queue management elements 122), respectively, configured to provide various application-based queue management functions, including application-based congestion control functions, for packets queued in the link buffer 120. The link scheduler 129 extracts packets from the class queues 121 and provides the packets to a link transmitter for transmission via an outgoing link of the communication device 100 (omitted for purposes of clarity).

The class mapper 110, as indicated above, receives packets to be transmitted via an outgoing link of the communication device 100 and maps the packets to the class queues 121 of the link buffer 120. The number N of class queues per link is typically limited (e.g., up to 8 class queues can be found in Ethernet interfaces). The class mapper 110 may map packets to class queues 121 such that each of the packets for a given flow are mapped onto the same class and, thus, the same class queue 121 (e.g., based on fields of the packet header that are identical for packets of the same flow but that usually do not include endpoint information (port numbers and IP addresses)). The class mapper 110 may map packets onto class queues 121 such that multiple flows are mapped onto the same class and, thus, the same class queue 121 (e.g., the class mapper 110 can try to distribute flows of different applications into different class queues 121 of different classes; however, due to the larger number of existing applications and the smaller number of classes that are typically available, it is normal to have flows of applications of different types mapped onto the same class and, thus, onto the same class queue 121). It is noted that mapping of packet arrivals to class queues 121 of traffic classes at the link buffer 120 is not needed if the link buffer 120 supports only a single traffic class.

The class queues 121 each may employ flow queuing for queuing of packets in flow queues of the class queues, respectively. The class queues 121 may employ flow queuing that assigns packets to flow queues within the class queues 121 at the granularity of individual flows based on sets of fields in the packet headers of the packets (e.g., based on the 5-tuple that includes the source and destination IP addresses, the source and destination port numbers, and the protocol identifier). The class queues 121 may employ run-time association of flows with flow queues (e.g., established upon arrival of the packets based on hashing of selected fields of the headers of the packet), rather than pre-provisioned mapping of flows onto flow queues (e.g., before the transmission of the first packet of the flow), based on stochastic fairness queuing (SFQ) or other mechanisms for real-time association of flows with flow queues within the class queues 121. It is noted that, in SFQ and other flow queuing schemes that use hashing for mapping flows onto queues, the fields that are hashed may be chosen so that the resulting hash value is the same for packets of the same flow and, ideally, always different for packets of different flows (in practice the separation of packets of different flows can only be probabilistic, where the probability of successful separation of different flows into different flow queues within the class queues 121 increases with the ratio between the number of available hash values and the number of simultaneously active flows). An example of a class queue 121 that employs run-time association of flows with flow queues is presented with respect to FIG. 2.

The queue management elements 122 may be configured to support application-based queue management functions, including application-based congestion control functions, for packets queued in the link buffer 120.

The queue management element 122 for a class queue 121 may be configured to support queue management for packets queued within flow queues of the class queue 121. The queue management element 122 for a class queue 121 may be configured to support queue management for packets queued within flow queues of the class queue 121 based on use of a set of trigger templates configured to be applied for packets handled by the class queue 121 for determining handling of packets queued in the flow queues of the class queue 121. For example, the trigger templates may be application-based trigger templates (e.g., based on the application types of the traffic, applications of the traffic, or the like, as well as various combinations thereof). For example, the trigger templates may be applied at the input to the flow queues of the class queue 121 and at the output from the flow queues of the class queue 121. For example, the trigger templates may define queue management conditions to be evaluated and associated queue management actions to be performed when the queue management conditions are satisfied (which, in the case of congestion control management as discussed herein, may include congestion control conditions and associated congestion control actions, respectively, for providing congestion control management for packets queued in the flow queues of the class queue 121).

The queue management element 122 for a class queue 121 may be configured to support queue management, including congestion control functions, for packets queued within flow queues of the class queue 121 based on various example embodiments for supporting application-based queue management functions, including application-based congestion control functions, which may be referred to herein as Tailored-SFQ (T-SFQ). It is noted that at least some embodiments of T-SFQ may augment SFQ policies with the ability to trigger congestion control (e.g., using packet drops, Explicit Congestion Notification (ECN) marking, in-band information insertion by header extensions, out-of-band messages, modification of state indicators of flow queues, or the like) consistently for flows based on application-related aspects of the flows (e.g., the application type of the traffic flow, the application of the traffic flow, or the like). It is noted that at least some embodiments of T-SFQ may be configured to allow link buffers to differentiate the triggers for the generation of congestion control signals on a per-application-related basis (e.g., per application type, application, or the like), within sets of traffic flows that belong to the same handling priority (e.g., quality-of-service (QoS) class, scheduling priority, or the like). It is noted that at least some embodiments of T-SFQ may be particularly well-suited for link buffers where it is not possible to explicitly provision a queue, nor a queue management policy, when a new flow is established. It is noted that at least some embodiments of T-SFQ may include a set of flow queues within a traffic class (only one traffic class is present when the link buffer does not perform class mapping) equipped with a hash function for mapping application flows onto respective queues, a set of trigger templates for associating each packet with a queue management policy and executing actions of the policy (including triggering congestion control signals) when conditions of the policy are satisfied, and a management interface for configuration of the trigger templates. It is noted that at least some embodiments of T-SFQ may be configured to support various other functions for supporting application-based queue management functions, including application-based congestion control functions, for packets queued in flow queues of a link buffer.

The queue management elements 122 of the class queues 121 may be configured to support various other functions for providing queue management for packets queued within flow queues of the class queues 121.

The link scheduler 129, as indicated above, extracts packets from the class queues 121 and provides the packets to a link transmitter for transmission via an outgoing link of the communication device 100 (omitted for purposes of clarity). The link scheduler 129 may be configured to service the class queues 121 based on various scheduling algorithms and criteria. For example, the link scheduler 129 may be configured to service the class queues 121 based on round robin service, based on the priorities of the traffic classes of the class queues 121, based on fairness criteria (e.g., same number of transmitted packets, same number of transmitted bytes, or the like, as well as various combinations thereof), or the like, as well as various combinations thereof. It will be appreciated that the link scheduler 129 may service the class queues 121 in various other ways for extracting packets from the class queues 121 and providing the packets to a link transmitter for transmission via an outgoing link of the communication device 100 (omitted for purposes of clarity).

It will be appreciated that the communication device 100 may be configured to provide various other functions configured to support queue management for queues queuing packets awaiting transmission from the communication device 100.

Figure 2:
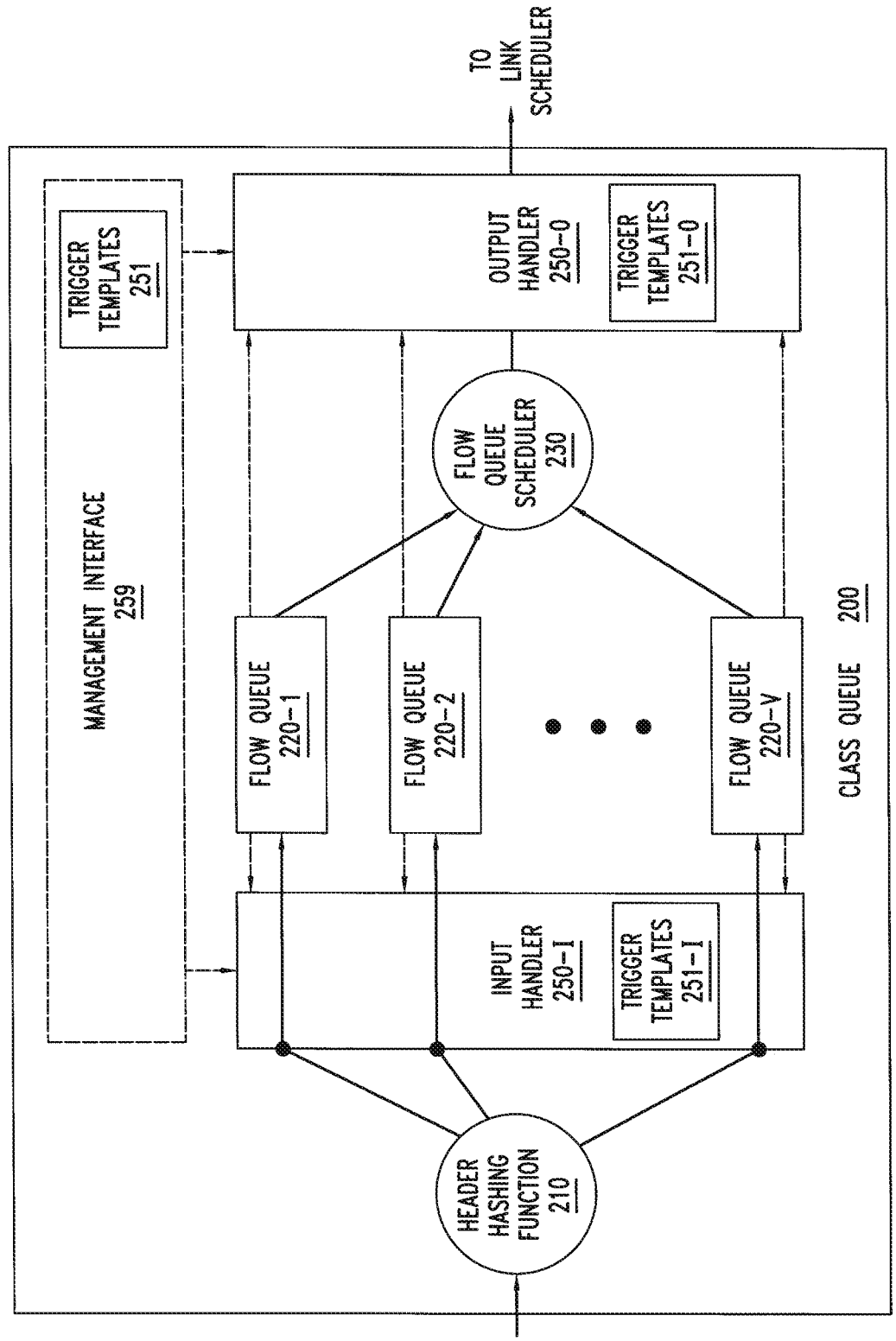
FIG. 2 depicts an example embodiment of a class queue, including a set of flow queues, configured to support congestion control using trigger templates.

FIG. 2 depicts an example embodiment of a class queue, including a set of flow queues, configured to support congestion control using trigger templates.

It will be appreciated that the class queue 200 of FIG. 2 may be used as one of the class queues 121 of communication device 100 of FIG. 1.

The class queue 200 is configured to support queuing of packets. The class queue 200 includes a header hashing function 210, a set of flow queues 220-1 to 220-V (collectively, flow queues 220), and a flow queue scheduler 230. The header hashing function 210 hashes headers of packets arriving to the class queue 200 (e.g., arriving from the class mapper 110 of FIG. 1) to determine the flow queues 220 in which the packets are to be stored and provides the packets to the flow queues 220. The header hashing function 210 may map packets of flows to flow queues 220 such that (1) association of flows to flow queues 220 is not predetermined (e.g., such that association of flows to flow queues 220 is stochastic (e.g., based on SQF)) and (2) for each of the flows, each of the packets of the flow are mapped onto the same flow queue 220 (e.g., based on fields of the packet header that are identical for packets of the same flow, such as the IP addresses, the port numbers, and the protocol identifier). The flow queues 220 queue the packets of the flows. The flow queues 220 each may queue packets of multiple flows. The flow queues 220 queue the packets of the flows until the packets are extracted from the flow queues 220 by the flow queue scheduler 230. The flow queue scheduler 230 controls retrieval of packets from the flow queues 220 for transmission via an outgoing link (e.g., to be provided to the link scheduler 129 of FIG. 1). The flow queue scheduler 230 may be configured to service the flow queues 220 based on various scheduling algorithms and criteria. For example, the flow queue scheduler 230 may be configured to service the flow queues 220 based on fairness criteria (e.g., same number of transmitted packets, same number of transmitted bytes, or the like, as well as various combinations thereof). It will be appreciated that the flow queue scheduler 230 may service the flow queues 220 in various other ways for extracting packets from the flow queues 220 and providing the packets for transmission via an outgoing link (e.g., to be provided to the link scheduler 129 of FIG. 1).

The class queue 200 is configured to support queue management for the flow queues 220. The class queue 200 includes a pair of handlers 250, including an input handler 250-I and an output handler 250-O, and a management interface 259, which are configured to support queue management for the flow queues 220. It will be appreciated that the handlers 250 and the management interface 259 may correspond to a queue management element 122 of a class queue 121 of FIG. 1.

The handlers 250 are configured to support queue management for the flow queues 220. The queue management provided for the flow queues 220 may include various types of queue management; although it will be appreciated that the queue management is primarily presented herein as being congestion control management.

The handlers 250 are configured to support congestion control for the flow queues 220 based on trigger templates 251 available to the handlers 250 (illustratively, trigger templates 251-I available for use by input handler 250-I and trigger templates 251-O available for use by output handler 250-O). The trigger templates 251 available to a given handler 250 may include application-based trigger templates 251 which may be defined for application types (e.g., voice applications, video applications, augmented reality applications, virtual reality applications, or the like), applications (e.g., voice application 1 from company 1, voice application 2 from company 2, video application 1 from company A, video application 2 from company B, or the like), or the like, as well as various combinations thereof. The trigger templates 251 available to a given handler 250 may include a default trigger template 251 to be applied for packets that do not match any of the application-based trigger templates 251. In general, a trigger template 251 may define one or more congestion control conditions and one or more congestion control actions to be performed when the one or more congestion control conditions are satisfied (e.g., a set of rules for mapping packets into criteria for triggering congestion control and processing steps that instantiate the criteria and the initiation of congestion control when the criteria for triggering congestion control are satisfied). It is noted that different trigger templates 251 may be provided for different instances of a common queue management algorithm (e.g., active queue management (AQM) or other queue management algorithms) that may differ in choice of conditions or actions performed, for different queue management algorithms, or the like, as well as various combinations thereof. It will be appreciated that the trigger templates 251-I and the trigger templates 251-O used by the input handler 250-I and the output handler 250-O, respectively, may be the same or different (e.g., congestion control conditions which may be different at the input and output sides of the flow queues 220 may be combined within a single trigger template 251 that is provided to both the input handler 250-I and the output handler 250-O or may be separated into different trigger templates 251 provided to the input handler 250-I and the output handler 250-O separately).

The handlers 250 are configured to support congestion control for the flow queues 220. The handlers 250 are configured to support congestion control for the flow queues 220 based on the trigger templates 251 available to the handlers 250. The handlers 250 may be configured to support congestion control for the flow queues 220 based on queuing of packets at the flow queues 220 (e.g., the input handler 250-I may be configured to apply the trigger templates 251-I to incoming packets for providing congestion control for packets in conjunction with placement of the packets into the flow queues 220 by the header hashing function 210, and the output handler 250-O may be configured to apply the trigger templates 251-O to outgoing packets for providing congestion control for packets in conjunction with removal of the packets from the flow queues 220 by the flow queue scheduler 230).

The handlers 250 may be configured to support congestion control for the flow queues 220, based on the trigger templates 251 available to the handlers 250, by applying one of the trigger templates 251 to a packet in conjunction with queuing of the packet in one of the flow queues 220. For example, for a given packet, a handler 250 is configured to identify, from the set of trigger templates 251 based on the packet, one of the trigger templates 251 to be applied for the packet and to apply the one of the trigger templates 251 for the packet.

The trigger template 251 to be applied for the packet may be identified based on a set of classification rules for mapping packets to trigger templates 251 (e.g., based on evaluation of various fields in the header of the packet, deep packet inspection of the packet, or the like). The trigger template 251 to be applied for the packet may be an application-based trigger template 251 that may be identified based on identification of an application type or application of the packet (e.g., based on evaluation of various fields in the header of the packet, deep packet inspection of the packet, or the like). The trigger template 251 to be applied for the packet may be a default trigger template 251 (e.g., where the packet is not identified as matching any of the application-based trigger templates 251).

The trigger template 251 to be applied for the packet may be applied for determining whether to initiate congestion control for the one of the flow queues 220 with which the packet is associated. The determination, based on the trigger template 251 to be applied for the packet, as to whether to initiate congestion control for the one of the flow queues 220 with which the packet is associated may be performed by evaluating one or more congestion control conditions specified within the trigger template 251 to be applied for the packet. The congestion control conditions of the trigger templates 251 may be based on packet information of the packet (e.g., the application type of the packet, the application of the packet, of the like) which may be determined based on information associated with the packet (e.g., based on one or more header fields of the packet or other information included within or associated with the packet), flow information associated with the flow of the packet (e.g., whether the flow is a Transmission Control Protocol (TCP) data flow, a User Datagram Protocol (UDP) data flow, or the like) which may be determined based on information associated with the packet (e.g., based on one or more header fields of the packet or other information included within or associated with the packet), data source information associated with the data source of the packet (e.g., whether the data source is a TCP sender, a UDP sender, or the like), which may be determined based on information associated with the packet (e.g., based on one or more header fields of the packet or other information included within or associated with the packet), flow queue state information of the flow queues 220 (which, as illustrated in FIG. 2, may be made available to the handlers 250 for use in evaluating congestion control conditions), or the like, as well as various combinations thereof. It will be appreciated that the congestion control conditions that are evaluated may be different at the input to the flow queues 220 (e.g., trigger templates 251-I used by input handler 250-I, which may include congestion control conditions related to the queue lengths of the flow queues 220 (which, as indicated above, may be received from the flow queues 220 by the input handler 250-I), other conditions related to the arrival of packets to the flow queues 220 and queuing of the packets in the flow queues 220, or the like, as well as various combinations thereof) and at the output from the flow queues 220 (e.g., trigger templates 251-O used by output handler 250-O, which may include congestion control conditions related to the queuing latencies of the flow queues 220 (which, as indicated above, may be received from the flow queues 220 by the output handler 250-O), other conditions related to the departure of packets from the flow queues 220 under control of flow queue scheduler 230, or the like, as well as various combinations thereof).

The handlers 250 may be configured to support congestion control for the flow queues 220, based on the trigger templates 251 available to the handlers 250, by applying one of the trigger templates 251 to a packet in conjunction with queuing of the packet in one of the flow queues 220. For example, a handler 250, based on a determination that a matching trigger template 251 is found for a packet, may handle the packet according to the queue management policy of the matching trigger template 251, possibly leading to the generation of a congestion control signal. For example, a handler 250, based on a determination that a matching application-based trigger template 251 is not found for a packet, may apply a default trigger template 251 with default triggers for congestion signals for use for packets that do not match any of the application-based trigger templates 251. For example, the current state of the destination flow queue 220 of a packet (e.g., the current length of the queue) may contribute to the outcome of the actions performed by the input handler 250-I (e.g., where the outcome may be to accept the packet as is, drop the packet, apply ECN marking to the packet consistently with the type of ECN marking that the packet header advertises, generate an out-of-band signal to the source of the packet or to a signaling server that supports the identified application, modify one or more state indicators of one or more flow queues 220, or the like, as well as various combinations thereof). It is noted that a decision to accept or mark the packet may be overridden if the packet arrival finds the overall buffer saturated and the policy that controls the aggregate occupancy of the flow queues decides that the incoming packet must be dropped. For example, upon departure of a packet, the header of the packet may be compared once more against the available trigger templates 251, to determine if the corresponding criteria for triggering congestion signaling require any action also on departing packets (again, the outcome of applying the criteria may be to leave the packet as is, drop it, mark it, generate an out-of-band signal, modify one or more state indicators of one or more flow queues 220, or the like). For example, the time spent in the queue by the departing packet may be a reason for triggering a congestion signal. It will be appreciated that the handlers 250 may be configured to support congestion control for the flow queues 220, based on the trigger templates 251 available to the handlers 250, in various other ways.

The handlers 250, based on a determination that the one or more congestion control conditions of a trigger template 251 that is being applied for a packet associated with a flow queue 220 are satisfied, may initiate one or more congestion control actions specified within the trigger template 251. For example, congestion control actions which may be initiated by a handler 250 for a packet based on application of a matching trigger template 251 for the packet may include dropping the packet (e.g., since data sources providing packets based on some protocols, such as TCP, may interpret a packet loss as a request to lower the packet transmission rate). For example, congestion control actions which may be initiated by a handler 250 for a packet based on application of a matching trigger template 251 for the packet may include initiating congestion control signaling (e.g., since data sources providing packets based on some protocols, such as TCP, may lower the packet transmission rate in response to congestion control signals) such as in-band congestion control signaling or out-of-band congestion control signaling, or the like, as well as various combinations thereof. The in-band congestion control signaling may include use of Explicit Congestion Notification (ECN) signaling, packet header extensions, other suitable types of in-band congestion control signaling. The out-of-band congestion control signaling may include any suitable types of out-of-band congestion control signaling (e.g., which may be based on various protocols or signaling types). It will be appreciated that the congestion control signaling may be initiated upstream to the data source, may be initiated downstream to a data receiver which may then be responsible for sending the congestion control signaling upstream to the data source, may be initiated to one or more other devices (e.g., servers, management systems, or the like) which may perform various functions responsive to the congestion control signaling (e.g., directing the congestion control signaling to the data source, initiating management actions, or the like), or the like, as well as various combinations thereof. For example, congestion control actions which may be initiated by a handler 250 for a packet based on application of a matching trigger template 251 for the packet may include modifying one or more state indicators of one or more flow queues (e.g., extraction of a packet from the head of a flow queue and return of the same packet to the tail of the same flow queue, extraction of a packet from the head of a flow queue and return of the same packet to the tail of a different flow queue, or the like). It will be appreciated that various other types of congestion control actions which may be initiated by a handler 250 for a packet based on application of a matching trigger template 251 for the packet.

The handlers 250, based on a determination that the one or more congestion control conditions of a trigger template 251 that is being applied for a packet associated with a flow queue 220 are not satisfied, may prevent initiation of the one or more congestion control actions specified within the trigger template 251. On the input side, for example, the input handler 250-I may simply accept the packet and allow it to be queued within the associated flow queue 220 without triggering any congestion control action (e.g., based on logic within the trigger template 251-I being applied for the packet, based on other logic in response to a determination that the one or more conditions of the trigger template 251-I being applied for the packet are not satisfied for the packet, or the like, as well as various combinations thereof). On the output side, for example, the output handler 250-O may simply accept the packet and allow it to be passed from the flow queue scheduler 230 toward the link transmitter, after being de-queued from the associated flow queue 220, without triggering any congestion control action (e.g., based on logic within the trigger template 251-O being applied for the packet, based on other logic in response to a determination that the one or more conditions of the trigger template 251-O being applied for the packet are not satisfied for the packet, or the like, as well as various combinations thereof). The handlers 250, based on a determination that the one or more congestion control conditions of a trigger template 251 that is being applied for a packet associated with a flow queue 220 are not satisfied, may perform various other functions.

The handlers 250, as indicated above, are configured to support congestion control for the flow queues 220. The handlers 250 may be configured to run algorithms configured to support congestion control for the flow queues 220, where such algorithms may be based on a set of configuration parameters and state variables, which may be managed in various ways.

In at least some embodiments, for example, the configuration parameters are pre-provisioned and associated with the trigger template 251 when the trigger template 251 is configured and the state variables are dynamically associated with the queue when the queue is used by packets that match the trigger template 251. It is noted that, since the variables may be different for different algorithms, each of the flow queues 220 may be equipped with a generic storage area for state variables associated with trigger templates 251. The identity of the state variables and their placement in the storage area of the flow queue 220 at runtime may be defined by a data structure template that is also associated with the trigger template 251.

In at least some embodiments, for example, each of the flow queues 220 maintains a fixed set of state variables (e.g., instantaneous queue length, average queue length, or the like, as well as various combinations thereof) and the algorithms and trigger templates 251 are based on the fixed set of state variables available from the flow queues 220.

In at least some embodiments, for example, each of the flow queues 220 may maintain a flow queue memory configured to support implementation of embodiments of T-SFQ, where the flow queue memory of the flow queue 220 maintains head and tail packet pointers, a next-flow queue pointer that points to the next flow queue 220 to be visited by the flow queue scheduler 230, and a set of congestion control state variables configured to store state information which may be provided to the handlers 250 for use in evaluating congestion control conditions of trigger templates 251 for supporting congestion control for the flow queues 220. It will be appreciated that the flow queue memory of the flow queue 220 may maintain other types of information which may or may not be used for supporting congestion control for the flow queues 220.

It will be appreciated that the various configuration parameters and state variables used by the handlers 250 to support congestion control for the flow queues 220 may be managed in various other ways.

The handlers 250, as indicated above, may be configured to support application of various types of trigger templates 251 which may be defined in various ways (e.g., using various combinations of congestion control conditions to be satisfied before congestion control is initiated, using various types of congestion control actions which may be initiated under various circumstances, or the like, as well as various combinations thereof). For example, a trigger template 251 may be defined for applications that use a TCP data source that responds to a version of an ECN protocol for control of a TCP congestion window. For example, a trigger template 251 may be defined for applications that use a TCP data source that responds to a scalable version of an ECN protocol for control of a TCP congestion window. For example, a trigger template 251 may be defined for real-time video streams that use a real-time transport protocol (RTP) for encapsulation of video content, UDP for end-to-end transport, and a Self-Clocked Rate Adaptation (SCReAM) protocol for adaptation of video encoding rate to bandwidth conditions of a network path. For example, a trigger template 251 may be defined for Differentiated Services Code Point (DSCP)-based flows (e.g., Lower-Effort (LE) Per-Hop Behavior (PHB) flows, non-queue-building (NQB) flows, or the like). For example, a trigger template 251 may be a defined for Quick UDP Internet Connections (QUIC) flows (which also could advertise support for scalable ECN feedback). For example, a trigger template 251 may be defined for Domain Name Service (DNS) flows (e.g., to leverage local caches). For example, a trigger template 251 may be defined for direct memory access flows (e.g., Remote Direct Memory Access (RDMA) flows, RDMA over Converge Ethernet (ROCE) flows, or the like). It will be appreciated that various other types of trigger templates 251 (e.g., for various technology types, flow types, protocols, or the like, as well as various combinations thereof) may be defined and applied by the handlers 250 for supporting congestion control for packets queued in the flow queues 220.

The management interface 259 is configured to support configuration of the handlers 250 to support queue management for the flow queues 220. The management interface 259 is configured to provision the trigger templates 251 on the handlers 250 for use by the handlers 250 in supporting queue management for the flow queues 220. The management interface 259 may provision the trigger templates 251 on the handlers 250, for use by the handlers 250 in supporting queue management for the flow queues 220, such that the trigger templates 251 (and, thus, the associated criteria for control of congestion control triggers and the congestion control triggers to be performed) are relatively fixed or relatively dynamic. The management interface 259 may dynamically update the trigger templates 251 in response to various conditions (e.g., receipt of new flows or termination of existing flows, detection of flows of new application types or lack of flows of existing application types, detection of flows of new applications or lack of flows of existing applications, instantiation of new flow queues 220 or termination of existing flow queues 220, or the like, as well as various combinations thereof), in various ways (e.g., adding new trigger templates 251, removing existing trigger templates 251, updating various aspects of existing trigger templates 251, or the like, as well as various combinations thereof), or the like, as well as various combinations thereof.

It will be appreciated that, although omitted for purposes of clarity, a congestion control response may be initiated in response to congestion control initiated by the class queue 200. The congestion control response may be initiated by any suitable element of the flow of the packet for which congestion control is initiated by the class queue 200 (e.g., the data source, the data receiver, a server or management system, or the like, as well as various combinations thereof). The congestion control response that is initiated may depend on various factors, such as the device type of the data source, the device configuration of the data source, the congestion control policy of the data source, the protocol of the flow of the data source, or the like, as well as various combinations thereof. It will be appreciated that, although primarily described with respect to embodiments in which a data source using a particular transport layer protocol (e.g., TCP)

may initiate a particular type of congestion control response (e.g., lowering its transmission rate) based on particular types of congestion control signaling (e.g., packet losses and ECN markings), data sources using other transport layer protocols (e.g., UDP or the like) may also initiate congestion control responses, data sources may initiate other types of congestion control responses (e.g., changing priorities or the like), data sources may initiate congestion control responses based on other types of congestion control signaling (e.g., header extensions, out-of-band messaging, or the like), or the like, as well as various combinations thereof). For example, congestion control responses performed by data sources based on various types of congestion control signaling received by the data sources may be supported by data sources of using various other protocols (which may include transport layer protocols or protocols at other communication layers), such as data sources using other transport layer protocols (e.g., the datagram congestion control protocol (DCCP), the stream control transmission protocol (SCTP), or the like), data sources using higher layer protocols which rely on the user datagram protocol (UDP) for end-to-end transport (e.g., higher layer protocols such as QUIC, Google congestion control (GCC), self-clocked rate adaptation for multimedia (SCReAM), or the like), and so forth. For example, cross-layer congestion control mechanisms may use in-band or out-of-band signaling to notify the data source of congestion-inducing conditions observed at the link, medium-access-control (MAC), or physical layer. It will be appreciated that various data sources using various other protocols may be configured to initiate various other types of congestion control responses based on various other types of congestion control signaling.

It will be appreciated that the class queue 200 may be configured to support various other functions for supporting queue management including congestion control management.

Figure 3:
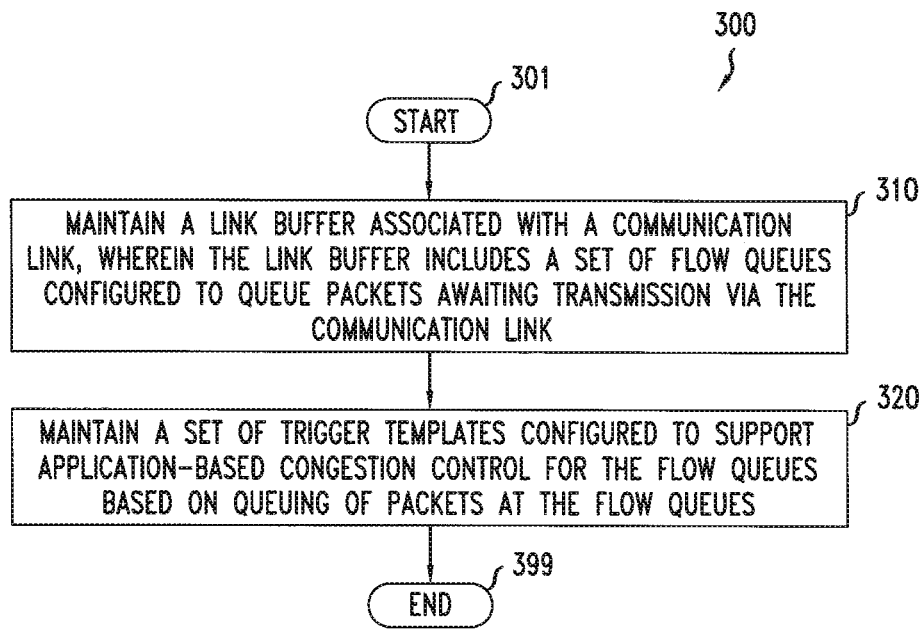
FIG. 3 depicts an example embodiment of a method for supporting congestion control using trigger templates.

FIG. 3 depicts an example embodiment of a method for supporting congestion control using trigger templates. It will be appreciated that, although primarily presented as being performed serially, at least a portion of the functions of method 300 may be performed contemporaneously or in a different order than as presented with respect to FIG. 3. At block 301, method 300 begins. At block 310, maintain a link buffer associated with a communication link, wherein the link buffer includes a set of flow queues configured to queue packets awaiting transmission via the communication link. At block 320, maintain a set of trigger templates configured to support application-based congestion control for the flow queues based on queuing of packets at the flow queues. At block 399, method 300 ends. In at least some example embodiments, at least a portion of the trigger templates are associated with respective application types (e.g., multimedia, video, audio, or the like). In at least some example embodiments, at least a portion of the trigger templates are associated with respective applications. In at least some example embodiments, the set of trigger templates includes a default trigger template to be applied for packets that do not match any other trigger template in the set of trigger templates. In at least some example embodiments, for at least one of the trigger templates, the respective trigger template includes a respective congestion control condition and a respective congestion control action to be performed based on a determination that the respective congestion control condition is satisfied. In at least some example embodiments, one of the trigger templates may be applied for a packet associated with one of the flow queues based on queuing of the packet in the one of the flow queues. In at least some example embodiments, applying the one of the trigger templates may include identifying, from the set of trigger templates based on the packet, the one of the trigger templates and performing, based on the one of the trigger templates, a determination as to whether to initiate congestion control for the one of the flow queues. In at least some example embodiments, the one of the trigger templates is identified based on a header of the packet. In at least some example embodiments, the one of the trigger templates includes a congestion control condition and a congestion control action, and the determination as to whether to initiate the congestion control action for the one of the flow queues is based on evaluation of the congestion control condition. In at least some example embodiments, the congestion control action includes one or more of dropping the packet, initiating in-band congestion control signaling, initiating out-of-band congestion control signaling, or modifying one or more state indicators of one or more flow queues. In at least some example embodiments, the determination as to whether to initiate congestion control for the one of the flow queues is further based on state information received from the one of the flow queues. In at least some example embodiments, applying the one of the trigger templates may include initiating, based on a determination to initiate congestion control for the one of the flow queues, a congestion control action configured to provide congestion control for the one of the flow queues. In at least some example embodiments, applying the one of the trigger templates may include preventing, based on a determination not to initiate congestion control for the one of the flow queues, initiation of a congestion control action configured to provide congestion control for the one of the flow queues. In at least some example embodiments, the one of the trigger templates is applied by a packet handler associated with queuing of the packet in the one of the flow queues. In at least some example embodiments, the one of the trigger templates is applied by an input packet handler associated with queuing of the packet in the one of the flow queues upon arrival of the packet. In at least some example embodiments, the one of the trigger templates is applied by an output packet handler associated with retrieval of the packet from the one of the flow queues based on selection of the flow queue by a flow queue scheduler. In at least some example embodiments, the one of the trigger templates is associated with at least one of an application type or an application. In at least some example embodiments, the one of the trigger templates is a default trigger template. In at least some example embodiments, the set of trigger templates may be updated based on a management interface between a management element and a packet handler configured to control application of the trigger templates to packets based on queuing of the packets at the flow queues. In at least some example embodiments, generic congestion control also may be performed at the flow queues based on an overall occupancy of the link buffer. It will be appreciated that various embodiments presented herein within the context of FIGS. 1 and 2 may be incorporated within the context of method 300 of FIG. 3.

Figure 4:
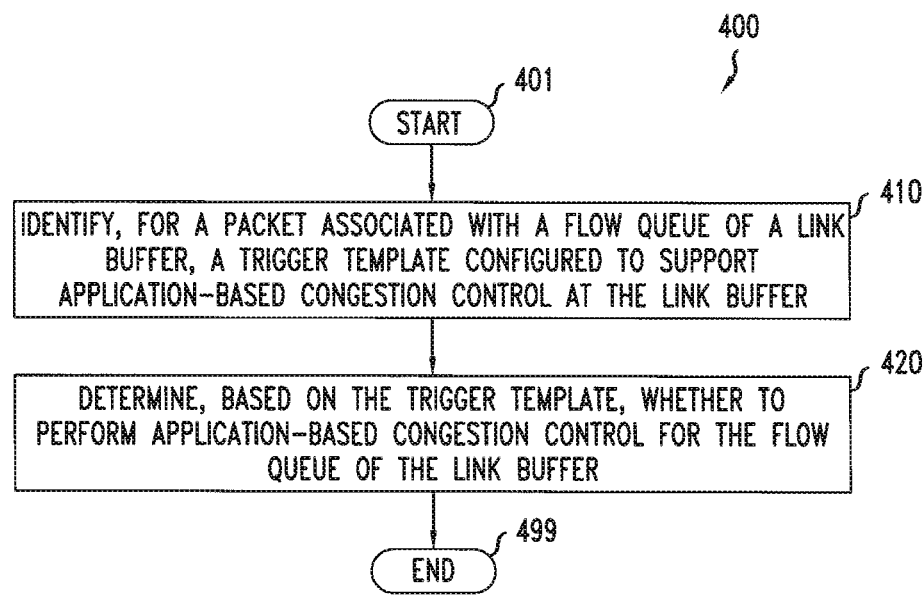
FIG. 4 depicts an example embodiment of a method for supporting congestion control using trigger templates.

FIG. 4 depicts an example embodiment of a method for supporting congestion control using trigger templates. It will be appreciated that, although primarily presented as being performed serially, at least a portion of the functions of method 400 may be performed contemporaneously or in a different order than as presented with respect to FIG. 4. At block 401, method 400 begins. At block 410, identify, for a packet associated with a flow queue of a link buffer, a trigger template configured to support application-based congestion control at the link buffer. At block 420, determine, based on the trigger template, whether to perform application-based congestion control for the flow queue of the link buffer. At block 499, method 400 ends. In at least some example embodiments, the trigger template is associated with an application type or an application. In at least some example embodiments, the trigger template is identified from a set of trigger templates based on the packet. In at least some example embodiments, the trigger template is identified from the set of trigger templates based on one or more header fields of the packet. In at least some example embodiments, the set of trigger templates includes a default trigger template to be applied for packets that do not match any other trigger template in the set of trigger templates. In at least some example embodiments, the trigger template is identified based on storage of the packet in the flow queue in conjunction with arrival of the packet to the link buffer. In at least some example embodiments, the trigger template is identified by an input handler associated with a set of flow queues including the flow queue. In at least some example embodiments, the trigger template is identified based on removal of the packet from the flow queue by a flow scheduler of the link buffer. In at least some example embodiments, the trigger template is identified by an output handler associated with a set of flow queues including the flow queue. In at least some example embodiments, the trigger template is identified by a packet hander of a class queue to which the flow queue belongs. In at least some example embodiments, the packet handler is an input handler associated with storage of the packet in the flow queue in conjunction with arrival of the packet to the link buffer or an output handler associated with removal of the packet from the flow queue by a flow scheduler of the link buffer. In at least some example embodiments, the trigger template includes a congestion control condition and a congestion control action to be performed based on a determination that the congestion control condition is satisfied. In at least some example embodiments, the congestion control action is based on at least one of information from the packet or state information from the flow queue. In at least some example embodiments, the congestion control action includes one or more of dropping the packet, initiating in-band congestion control signaling, initiating out-of-band congestion control signaling, or modifying one or more state indicators of one or more flow queues. In at least some example embodiments, determining whether to perform application-based congestion control for the flow queue of the link buffer may include performing an evaluation of the congestion control condition of the trigger template and determining, based on the evaluation of the congestion control condition of the trigger template, whether to initiate the congestion control action of the trigger template. In at least some example embodiments, the congestion control condition is evaluated based on at least one of information from the packet. In at least some example embodiments, the congestion control condition is evaluated based on state information received from the flow queue. In at least some example embodiments, the trigger template is identified based on storage of the packet in the flow queue in conjunction with arrival of the packet to the link buffer, and the state information received from the flow queue includes a queue length of the flow queue. In at least some example embodiments, the trigger template is identified based on removal of the packet from the flow queue by a flow scheduler of the link buffer, and the state information received from the flow queue includes a queuing latency of the flow queue. In at least some example embodiments, a congestion control action configured to provide congestion control for the flow queue may be initiated based on a determination to perform application-based congestion control for the flow queue. In at least some example embodiments, initiation of a congestion control action configured to provide congestion control for the flow queue may be prevented based on a determination not to perform application-based congestion control for the flow queue. In at least some example embodiments, the flow queue is based on SFQ. In at least some example embodiments, the trigger template may be updated based on a management interface between a management element and a packet handler configured to control application of the trigger template to packets based on queuing of the packets in the link buffer. In at least some example embodiments, generic congestion control may be performed at the link buffer based on an overall occupancy of the link buffer. It will be appreciated that various embodiments presented herein within the context of FIGS. 1 and 2 may be incorporated within the context of method 400 of FIG. 4.

Figure 5:
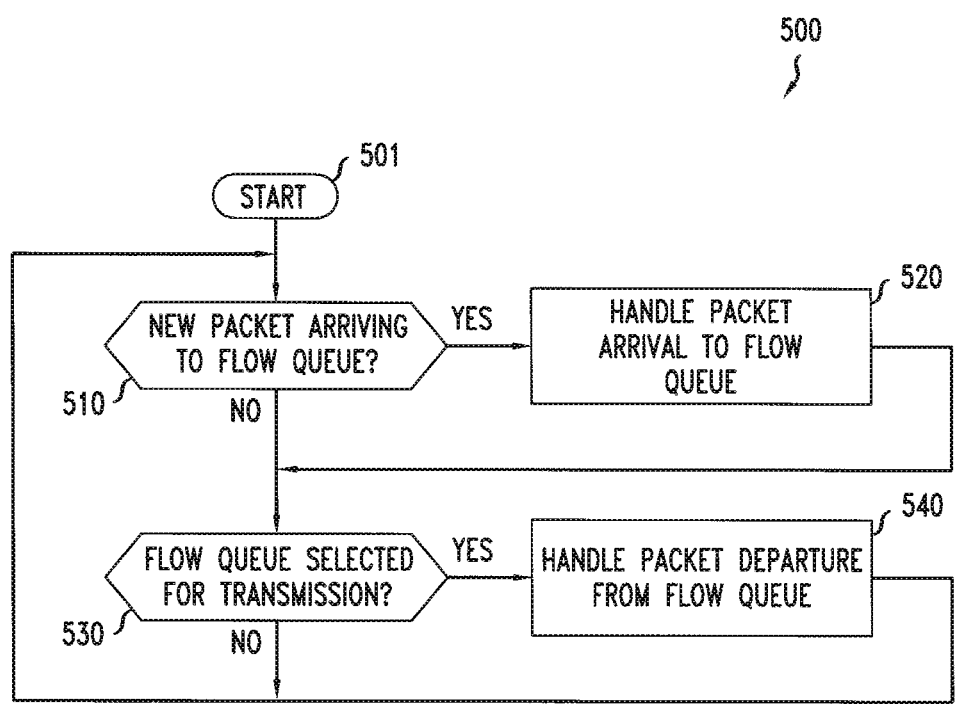
FIG. 5 depicts an example embodiment of a method of operation of a flow queue of a class queue configured to support congestion control using trigger templates.

FIG. 5 depicts an example embodiment of a method of operation of a flow queue of a class queue configured to support congestion control using trigger templates. It will be appreciated that, although primarily presented as being performed serially, at least a portion of the functions of method 500 may be performed contemporaneously or in a different order than as presented with respect to FIG. 5. At block 501, method 500 begins. At block 510, a determination is made as to whether a new packet is arriving to a flow queue. If a new packet is arriving to a flow queue, method 500 proceeds to block 520. If a new packet is not arriving to a flow queue, method 500 proceeds to block 530. At block 520, the packet arriving to the flow queue is handled. The handling of the packet includes identification and application of a trigger template for the packet. An example embodiment for handling a packet arriving to a flow queue is presented in FIG. 6. From block 520, method 500 proceeds to block 530. At block 530, a determination is made as to whether a flow queue has been selected for transmission of a packet of the flow queue. If a flow queue has been selected for transmission of a packet of the flow queue, method 500 proceeds to block 540. If a flow queue has not been selected for transmission of a packet of the flow queue, method 500 returns to block 510. At block 540, the packet departing from the selected flow queue is handled. The handling of the packet includes identification and application of a trigger template for the packet. An example embodiment for handling a packet departing from a flow queue is presented in FIG. 7. From block 540, method 500 returns to block 510. It will be appreciated that method 500 may continue to run as the flow queue is running.

Figure 6:
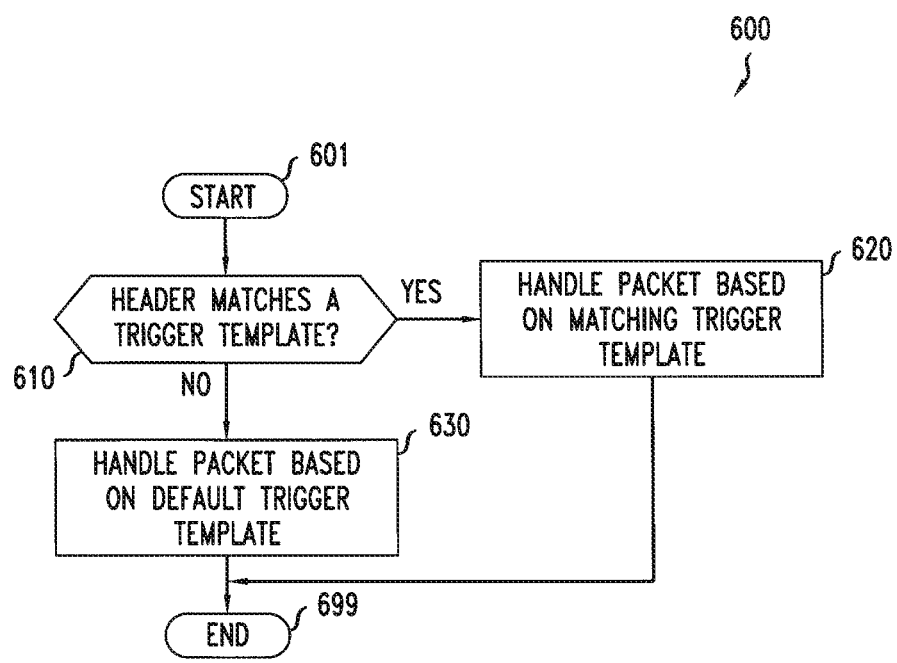
FIG. 6 depicts an example embodiment of a method of operation of a flow queue, of a class queue configured to support congestion control using trigger templates, for handling congestion control in conjunction with handling arrival of new packets to the flow queue based on queueing of new packets to the flow queue based on flow queue selection based on a hashing function.

FIG. 6 depicts an example embodiment of a method of operation of a flow queue, of a class queue configured to support congestion control using trigger templates, for handling congestion control in conjunction with handling arrival of new packets to the flow queue based on queuing of new packets to the flow queue based on flow queue selection based on a hashing function. It will be appreciated that, although primarily presented as being performed serially, at least a portion of the functions of method 600 may be performed contemporaneously or in a different order than as presented with respect to FIG. 6. At block 601, method 600 begins. At block 610, a determination is made as to whether a header of a packet matches a non-default trigger template. If the header of the packet matches a non-default trigger template, method 600 proceeds to block 620, where the packet is handled based on the non-default trigger template. If the header of the packet does not match a non-default trigger template, method 600 proceeds to block 630, where the packet is handled based on a default trigger template. The handling of a packet based on a trigger template may include determining, based on the trigger template, whether to initiate congestion control responsive to the packet, initiating congestion control responsive to the packet based on a determination to initiate congestion control responsive to the packet (e.g., dropping the packet, initiating a congestion control signal, modifying one or more state indicators of one or more flow queues, or the like), or the like, as well as various combinations thereof. From blocks 620 and 630, method 600 proceeds to block 699. At block 699, method 600 ends. It will be appreciated that method 600 of FIG. 6 may be used to provide block 520 of FIG. 5.

Figure 7:
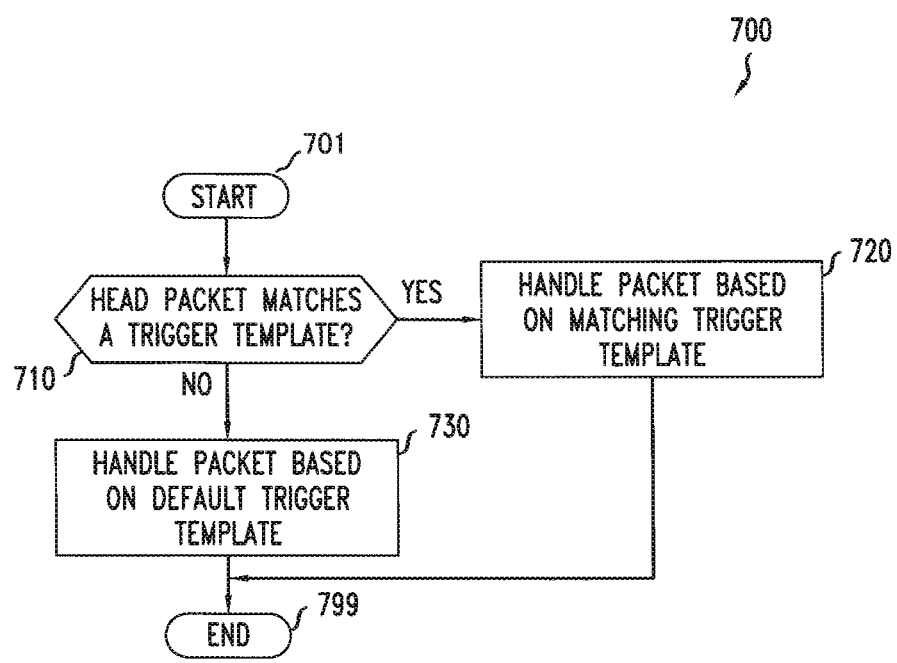
FIG. 7 depicts an example embodiment of a method of operation of a flow queue, of a class queue configured to support congestion control using trigger templates, for handling congestion control in conjunction with handling departure of existing packets from the flow queue based on flow queue selection by a flow queue scheduler.

FIG. 7 depicts an example embodiment of a method of operation of a flow queue, of a class queue configured to support congestion control using trigger templates, for handling congestion control in conjunction with handling departure of existing packets from the flow queue based on flow queue selection by a flow queue scheduler. It will be appreciated that, although primarily presented as being performed serially, at least a portion of the functions of method 700 may be performed contemporaneously or in a different order than as presented with respect to FIG. 7. At block 701, method 700 begins. At block 710, a determination is made as to whether a header of a head packet in a flow queue matches a non-default trigger template. If the header of the head packet in the flow queue matches a non-default trigger template, method 700 proceeds to block 720, where the packet is handled based on the non-default trigger template. If the header of the head packet in the flow queue does not match a non-default trigger template, method 700 proceeds to block 730, where the packet is handled based on a default trigger template. The handling of a packet based on a trigger template may include determining, based on the trigger template, whether to initiate congestion control responsive to the packet, initiating congestion control responsive to the packet based on a determination to initiate congestion control responsive to the packet (e.g., dropping the packet, initiating a congestion control signal, modifying one or more state indicators of one or more flow queues, or the like), or the like, as well as various combinations thereof. From blocks 720 and 730, method 700 proceeds to block 799. At block 799, method 700 ends. It will be appreciated that method 700 of FIG. 7 may be used to provide block 540 of FIG. 5.

Various example embodiments for supporting congestion control in a communication system based on use of trigger templates, including various embodiments referred to herein as T-SFQ, may be further understood based on the following examples.

In these examples, it is assumed that a T-SFQ instance is provisioned with the following four trigger templates configured to perform congestion control: (1) a first template for applications that use a TCP data source that responds to a non-scalable version of the ECN protocol for control of the TCP congestion window (e.g., based on IETF RFC 3168), (2) a second template for applications that use a TCP data source that responds to a scalable version of the ECN protocol (e.g., based on the IETF Internet Draft entitled "Low Latency, Low Loss, Scalable Throughput (L4S) Internet Service: Architecture," draft-ietf-tsvwg-14s-arch-03), (3) a third template for real-time video streams that use Real-time Transport Protocol (RTP) for the encapsulation of video content, User Datagram Protocol (UDP) for end-to-end transport, and the SCReAM protocol for adaptation of the video encoding rate to the bandwidth conditions of the network path, and (4) a fourth template which is the default template to be applied for all packets that do not match any of the first three templates.

In these examples, it is also assumed that the congestion control rules may be defined in the trigger templates as follows. The first template (TCP with non-scalable ECN) uses a fixed threshold $B_c$ on buffer occupancy to decide on the ECN marking of incoming packets. When a packet arriving at the flow queue finds that the queue occupancy $L_c$ of the flow queue is larger than $B_c$, the ECN field of its IP header is marked with the "congestion encountered" (CE) encoding (11). The second template (TCP with scalable ECN) uses a different threshold $B_s$, but the principle of operation is the same: T-SFQ marks the ECN field with the CE encoding when the length of the queue exceeds the threshold ($L_s > B_s$). The third template (SCReAM over RTP over UDP) applies classic ECN marking upon departure of a packet, but only if the packet carries an end-of-frame RTP message and only if the queuing delay of the entire video frame exceeds a target threshold (e.g., 40 ms or other suitable threshold). Packets that fall into the default template are not marked; rather, they are dropped upon arrival or while waiting at the head of the flow queue when so determined by the longest-queue-drop (LQD) policy that controls the overall occupancy of the T-SFQ buffer. It is noted that packets that match the non-scalable or scalable ECN templates also may be subject to the LQD policy for packet dropping (when an incoming packet finds that the T-SFQ buffer is full, it is dropped if it belongs to the longest queue; otherwise, it is accepted while the head packet of the longest queue is pushed out of that queue and dropped).

In a first example that is based on the four trigger templates described above, the template matching for incoming TCP packets is based on the ECN encoding of the TCP packets at the time of arrival. If the ECN encoding in the TCP packet is 00, or Non-ECT, the packet is assigned to the default template. If the encoding is 10, or ECT(0), the TCP packet is assigned to the classic ECN template. If the encoding is 01, or ECT(1), the TCP packet is assigned to the scalable ECN template. Finally, if the encoding is 11, or CE, the TCP packet is assigned to the default template. It is noted that the mapping of the TCP packet onto a flow queue is based on a prior hashing of the packet header and is not affected by the template classification. The mapping of incoming and departing packets onto the third template (video over RTP) is based upon recognition that the packet uses UDP transport, carries an RTP header, and is ECN-capable (ECT(0)). An end-of-frame packet, identified by a marker bit set to 1 in the RTP header, additionally triggers a measurement for the queuing delay of its video frame and possibly the CE marking of its IP header upon departure.

In a second example that is based on the four trigger templates described above, the execution of the ECN marking for the first and second templates is based on the queuing time of ECN-capable TCP packets, as measured upon their departure, and not on the occupancy level of the queue when they arrive. The thresholds used by the two templates are expressed in time units (e.g., milliseconds) instead of bytes or packets. Measuring the queuing time of packets upon their departure may be based on the association of an arrival timestamp with each packet. When a packet is ready for departure, its ECN encoding is checked. If equal to Non-ECT or CE, no further action is taken. If equal to ECT(0), the queuing time is computed and compared to the ECN threshold, and the packet is marked with CE if the measured delay exceeds the delay threshold. The same happens if the packet is marked with ECT(1), but using a delay threshold for the scalable ECN profile that may be different than the threshold for the classic ECN template.

It is noted that, in the above examples, the first template (non-scalable ECN) is suitable for large file transfers using the file transfer protocol (FTP) or for non-real-time adaptive-bit-rate (ABR) video streaming, the second template (scalable ECN template) is particularly well-suited for augmented reality (AR) applications or real-time adaptive bit-rate video over TCP transport, the third template (RTP template) is a good fit for real-time video over UDP, and the default template may be shared by all applications that do not support ECN (e.g., voice over IP, non-rate-adaptive video streaming, and so forth).

It will be appreciated that the foregoing examples represented merely a few of the various ways in which trigger templates may be defined, applied, and so forth.

Various example embodiments for supporting congestion control in a communication system based on use of trigger templates, including various embodiments referred to herein as T-SFQ, may provide various advantages or potential advantages.

Various example embodiments for supporting congestion control in a communication system based on use of trigger templates, including various embodiments referred to herein as T-SFQ, may provide various advantages or potential advantages which may be further understood by considering certain quantitative illustrations and associated results of various embodiments as discussed further below. These qualitative illustrations are based on an Open Air Interface (OAI) mobile RAN stack for 4G/5G. Each experiment runs two persistent TCP flows in parallel over a shared downlink radio bearer (the bearer bandwidth sustains about 16 Mb/s of TCP payload throughput). The UE does not move, so the bearer bandwidth is stable. Both flows use a datacenter TCP (DCTCP) source, which supports scalable ECN. The wget and iperf applications are used for generation of the flows (either both flows from the same application or one flow per application). The wget flow uses the HTTP protocol over TCP, so its downlink packets can be identified by the input and output handlers based on the source port number (80, 8008, or 8080). The iperf application uses generic port numbers. Both endpoints are configured for full support of ECN, but in our end systems (Linux Ubuntu 16.04) only the wget application honors this configuration. Also, the end systems only support the ECT(0) marking for signaling ECN-capable transport. If the queuing policy in the downlink packet buffer supports ECN, only wget packets can be marked. The marking threshold is based on buffer occupancy (4 queued packets); accordingly, packets need to be matched to a trigger template only upon arrival to the buffer and not upon departure. Both wget and iperf packets are subject to the longest-queue-drop (LQD) policy when the buffer saturates (the overall buffer space is 1,000 packets). The following queuing arrangements are used in different experiments: (1) SFQ: flow-queuing without ECN marking and with longest-queue drop (LQD) for all flows, (2) tailored-shared queuing (T-SQ): shared queue with ECN marking for wget flows and plain tail-drop policy for all flows, and (3) T-SFQ: flow queuing with ECN marking for wget flows and LQD for all flows. The average round-trip time (RTT) of the data path is 16 ms when lightly loaded (no contributions from queuing delay). This includes the air-interface scheduling delay on both downlink and uplink, plus the propagation delay from the OAI eNB to the wget/iperf server and back. The results show RTT plots (the 16 ms of base RTT are always included) and throughput plots (either the cumulative average throughput since the beginning of the measurements, or the average throughput computed over subsequent 100 ms intervals).

Figure 8:
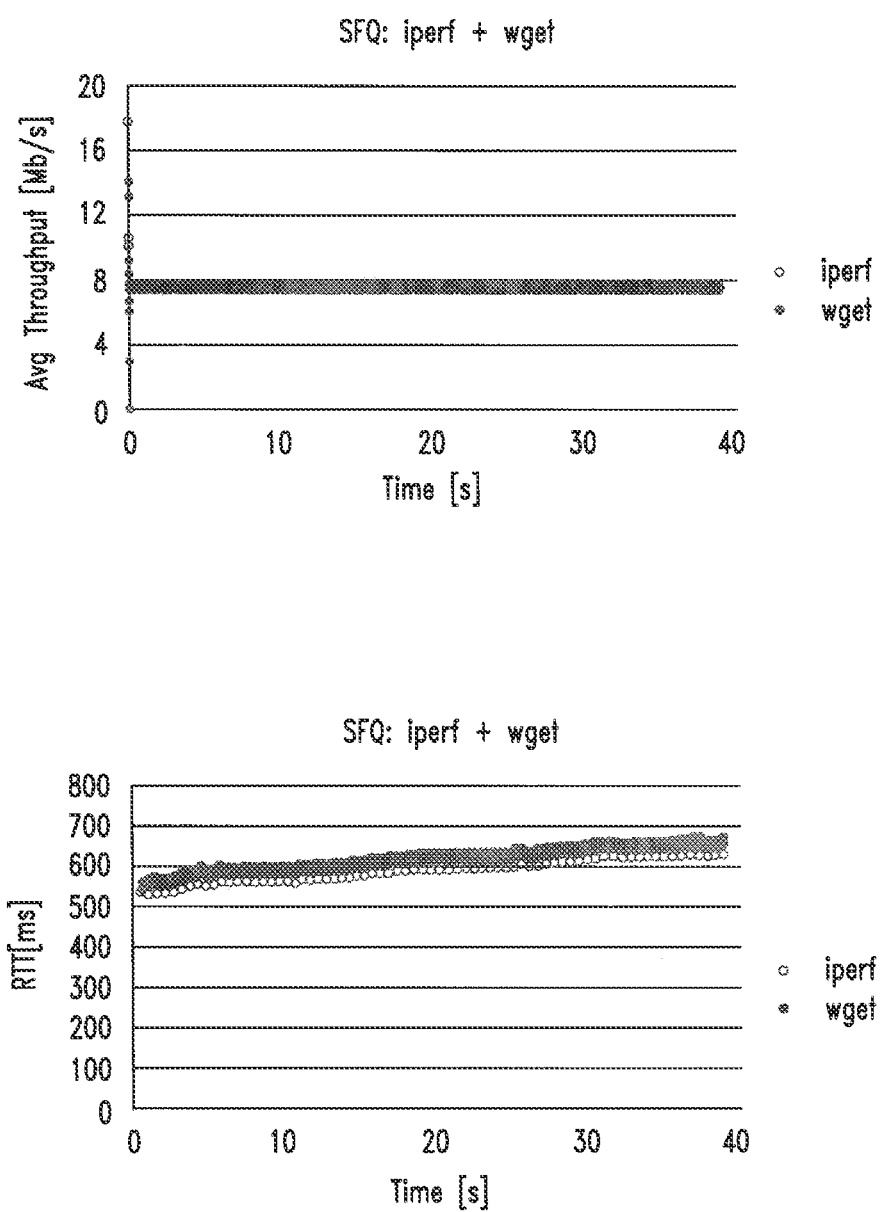
FIG. 8 depicts an example of results obtained for iperf and wget flows when plain SFQ is used.

FIG. 8 depicts the RTT and cumulative average throughput for the iperf and wget flows with plain SFQ (no ECN for the HTTP flow). The two flows achieve identical throughput, because of the fairness imposed by the scheduler once the respective flow queues are continuously backlogged. The large size of the total buffer space (1000 packets) and the slow growth of the DCTCP congestion window prevent the two flows from losing a single packet during the 40 s of the experiment included in the plots. The RTT grows large, because there are no means other than packet losses to signal congestion. The RTT of the wget flow is slightly higher because the flow was started first, so it has a (slightly) larger congestion window during the 40 s capture. The RTT difference does not translate into a throughput difference.

Figure 9:
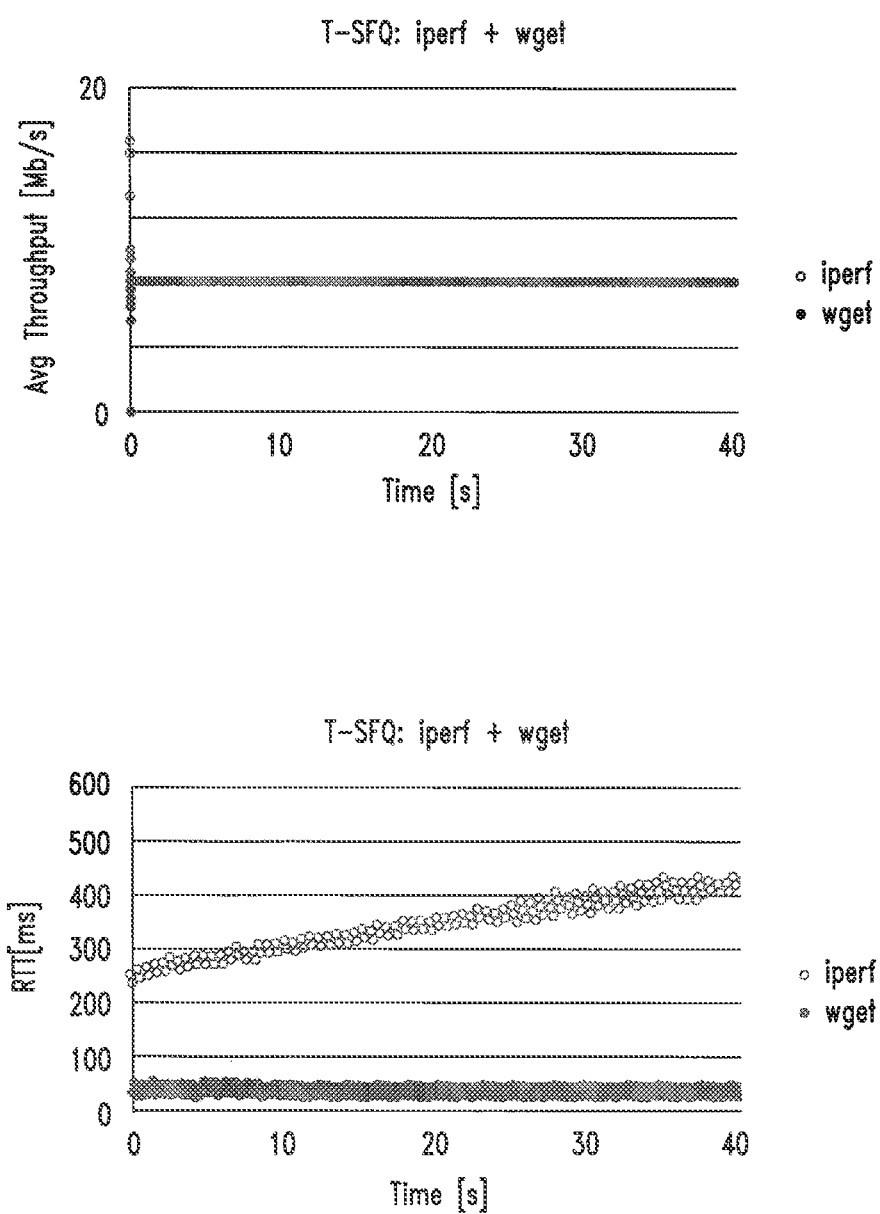
FIG. 9 depicts an example of results obtained for iperf and wget flows when embodiments of T-SFQ are used.

FIG. 9 depicts the effects of T-SFQ on the same traffic configuration as FIG. 8. The throughput is again identical for the two flows, but now the wget flow experiences much lower RTT levels, thanks to the activation of scalable ECN based on the identification of the HTTP payload and the detection of the ECT(0) marking in the incoming TCP packets.

Figure 10:
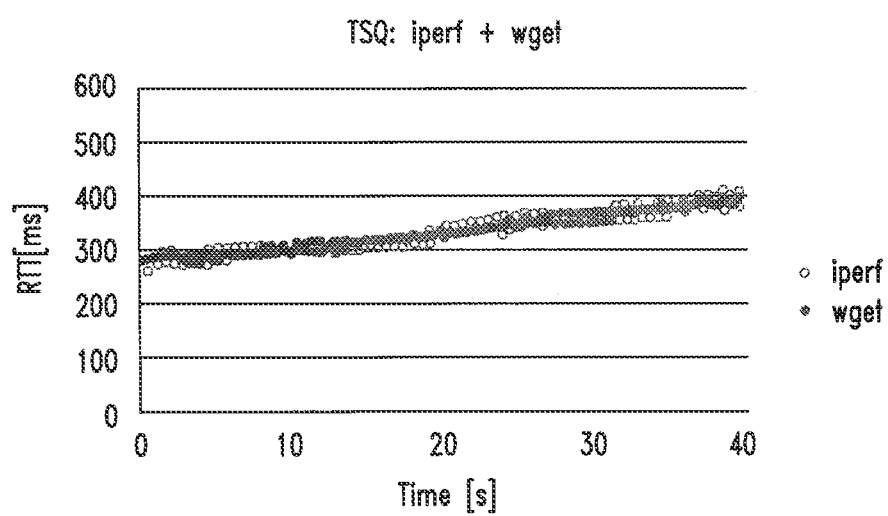
FIG. 10 depicts an example of the negative effect of applying the differentiation of congestion control signals without also deploying per-flow queues.
Figure 10:
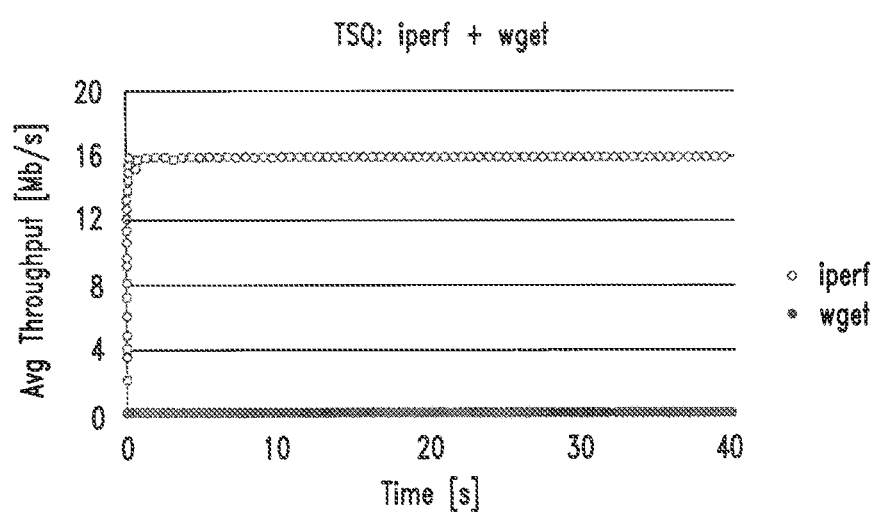

FIG. 10 depicts the negative effect of applying the differentiation of congestion control signals without also deploying per-flow queues: namely, the throughput of the flow that responds first to congestion signals (the wget flow in this case) is almost erased and no RTT differentiation can be appreciated.

Figure 11:
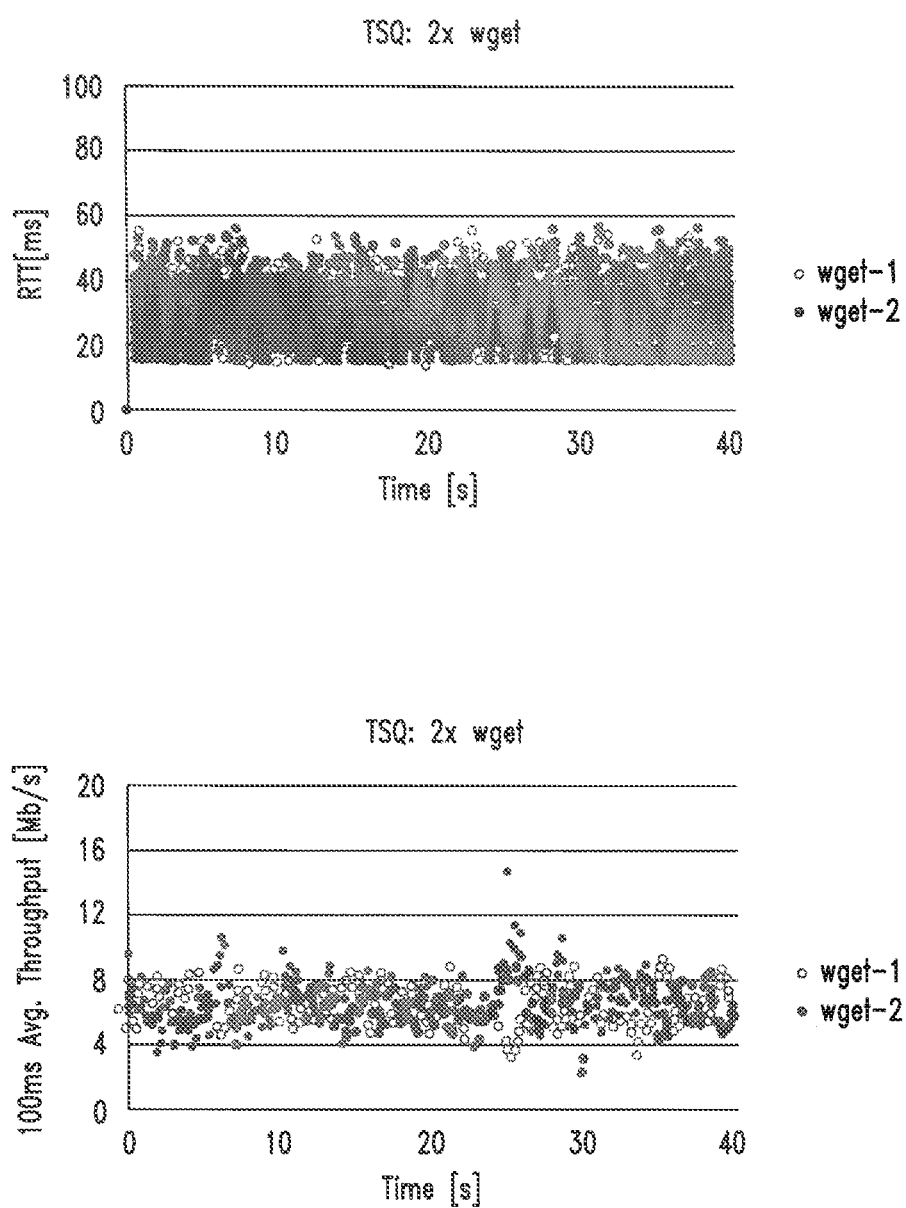
FIG. 11 depicts an example of results obtained for two wget flows that share a single queue with Explicit Congestion Notification (ECN) marking.

FIG. 11 depicts the RTT and throughput of two wget flows that share a single queue with ECN marking. As opposed to FIGS. 8-10, where the throughput is measured as the cumulative average since the beginning of the trace capture, the throughput samples of FIG. 11 represent averages computed over 100 ms intervals.

Figure 12:
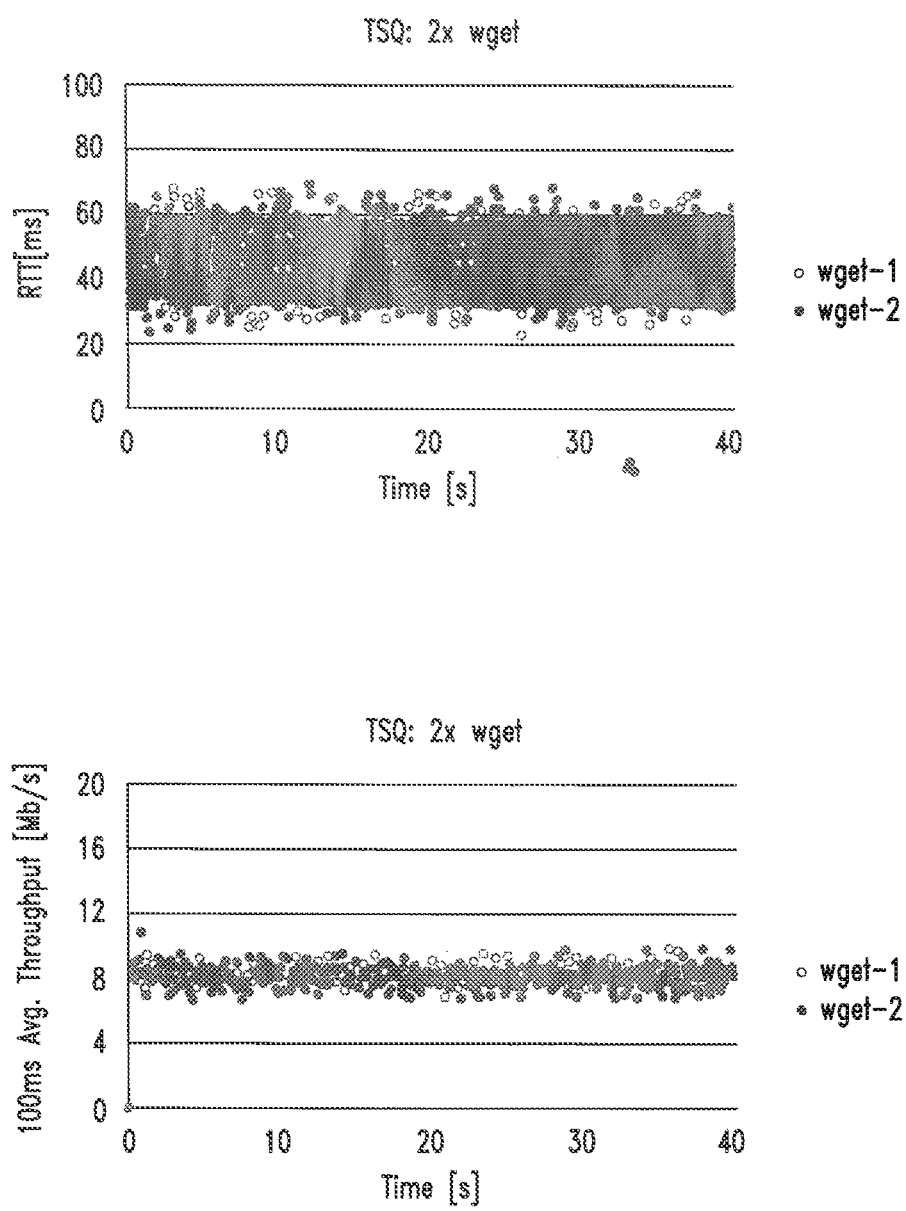
FIG. 12 depicts an example of results obtained for two wget flows when embodiments of T-SFQ are deployed at the link buffer of the downlink bearer.

FIG. 12 depicts the same metrics collected for two wget flows when T-SFQ is deployed at the packet buffer of the downlink bearer. The average RTT is slightly lower in the shared queue of FIG. 11, because the ECN threshold, which in this example is based on buffer occupancy, is the same in the two cases, but the output rate of the shared queue is twice the rate of the two flow queues of T-SFQ (instead, a delay-based ECN threshold would yield similar RTT levels independently of the number of active queues). The distribution of the throughput samples is much more compact in the T-SFQ case. This is due to the better fairness of the flow queuing arrangement. Such improved fairness can be best appreciated when the length of the data transfer associated with each flow is very short, because it yields a more predictable distribution of the flow completion time.

It will be appreciated, at least from FIGS. 8-12 as well as various other portions of the disclosure, that T-SFQ enables differentiation of delay performance (as opposed to plain SFQ), avoids any unfairness induced by the differentiation of congestion control triggers per application (as opposed to a shared queue), and provides fairness that is better than the fairness provided by per-class queues allocated per type of congestion control trigger, without requiring the provisioning of dedicated queues explicitly per flow (which is typically a complex and costly task since application sessions may come and go at a relatively high frequency and may last for a shorter time than it takes to prepare for handling them).

It will be appreciated, at least from FIGS. 8-12 as well as various other portions of the disclosure, that T-SFQ augments the SFQ scheme for mapping flows onto packet queues without pre-provisioning. This type of mapping (stochastic) is particularly useful when packet flows are defined at the finest level of granularity, of one flow per application session, because dynamically provisioning a dedicated queue for every application flow that is established (including concurrent flows for multiple instances of the same application) is generally not practical.

It will be appreciated, at least from FIGS. 8-12 as well as various other portions of the disclosure, that T-SFQ augmentation enables the execution of congestion control operations that are tailored to the specific needs of individual applications, so that each application can best control the performance metrics (throughput, end-to-end latency, and so forth) that are most relevant to its flawless operation. It is noted that augmentations like FQ-CoDel and FQ-PIE can only differentiate the congestion control treatment per packet (e.g., based on the ECT marking), but not per application.

It will be appreciated, at least from FIGS. 8-12 as well as various other portions of the disclosure, that T-SFQ preserves the traffic flow isolation offered by the underlying flow queuing arrangement. It is beneficial that application-specific actions can be applied to packet flows while using queues that are associated with flows on a random basis.

It will be appreciated, at least from FIGS. 8-12 as well as various other portions of the disclosure, that various embodiments presented herein define the general architecture and capabilities for enabling the tailoring of the congestion control treatment of individual flows, without requiring specification of the queue management policies that can be instantiated in the trigger templates, the data structures that support their operation, or the management interface through which the templates are configured, thereby providing a highly flexible and robust capability for enabling the tailoring of the congestion control treatment of individual flows.

Various example embodiments for supporting congestion control in a communication system based on use of trigger templates, including various embodiments referred to herein as T-SFQ, may provide various other advantages or potential advantages.

Various example embodiments for supporting application-based queue management may be configured to support application-based customization of queue management, including congestion control, based on application, application type, and so forth.

Various example embodiments for supporting application-based queue management may be configured to support diversified treatment of flows based on the needs of the respective applications of the respective flows. Various example embodiments for supporting application-based queue management may be configured to support application-based customization of queue management and congestion control. Various example embodiments for supporting application-based queue management may be configured to support application-based triggering of congestion control signals at link buffers based on the applications and/or application types that occupy the link buffers. Various example embodiments for supporting application-based queue management may be configured to support application-based programmability of various individual components of the congestion control function so that the various components can keep matching the needs of existing applications, new applications as soon as they are deployed, or the like, as well as various combinations thereof. Various example embodiments for supporting application-based congestion control may be configured to tailor the congestion control treatment of packet flows based on the unique needs of the respective applications or application types of the packet flows in link buffers where per-flow queues are not explicitly provisioned. Various example embodiments for supporting application-based queue management may be configured to support diversified congestion control treatment per packet, and, thus, per application or application type, for a traffic class that is supporting multiple flow queues queuing packets of different applications or application types.

Various example embodiments for supporting application-based queue management may be configured to support application-based customization of a congestion control paradigm, where the generation of congestion control signals (e.g., at link buffers) and consumption of congestion signals (e.g., at the data source or other elements) is tailored to each application and/or application type instead of being identical for different applications that share the same link buffer or end host. Various example embodiments for supporting application-based queue management may be configured to support application-based customization of a congestion control paradigm such that different applications that may need different levels of queuing delay and responsiveness to bandwidth variations, which typically end up operating under a single set of criteria for the generation and consumption of congestion control signals, may operate independently using different (e.g., application-specific or application-type-specific) criteria for the generation and consumption of congestion control signals. Various example embodiments for supporting application-based queue management may be configured to support differentiated handling of congestion control signaling for different applications that have different requirements with respect to the link buffer conditions that should trigger congestion signals, the subsequent responses by the data source, the timescale of operation of the control loop, and so forth. Various example embodiments for supporting application-based queue management may be configured to support differentiated handling of congestion control signaling for different applications by supporting application-specific and/or application-type-specific criteria for deciding to issue a congestion control signal to applications and application-specific and/or application-type-specific criteria for responding to congestion control signals, such that different applications may operate under different criteria for various aspects of congestion control (e.g., generation of congestion control signals, consumption of congestion control signals, or the like, as well as various combinations thereof).

Various example embodiments for supporting application-based queue management may be configured to support application-based customization of queue management based on application and/or application type in a manner that improves handling of applications that have different needs (e.g., non-real-time adaptive-bit-rate (ABR) video streaming applications and interactive applications like real-time ABR video streaming applications) when the applications share the same configuration of the data source and the same queue management policy in the link buffer. For example, applications like non-real-time ABR video streaming applications, which may tolerate larger queuing delays, suffer throughput (and video quality) degradation when the queuing discipline of the link buffer is configured for support of interactive applications and, thus, the user ends up watching video of poorer quality than the network could in fact support. Conversely, interactive applications like real-time ABR video streaming applications stop working, with chopped motion and frequent interruptions, when the link buffer is configured with loose thresholds on the buffer occupancy for the generation of congestion signals. Unfortunately, most times the two video streaming applications share the same configuration of the data source in the end host and the same queue management policy in the link buffer, so that at least one of them, if not both, drops to low quality-of-experience scores when congestion occurs. Various example embodiments for supporting application-based queue management may be configured to support application-based customization of queue management based on application and/or application type in a manner that improves handling of such applications when they share the same configuration of the data source in the end host and the same queue management policy in the link buffer, so that the impact of congestion is mitigated.

Various example embodiments for supporting application-based queue management may provide various advantages or potential advantages in various deployment scenarios. For example, various example embodiments of application-based queue management, including embodiments of T-SFQ, may provide various advantages or potential advantages when deployed in front of network links where the bandwidth available to individual flows changes relatively rapidly, such as in front of wireless access links (e.g., 4G, 5G, WiFi, or the like), in front of links of data center switches, or the like. For example, various example embodiments of application-based queue management, including embodiments of T-SFQ, may provide various advantages or potential advantages when deployed in WiFi access points. For example, various example embodiments of application-based queue management, including embodiments of T-SFQ, may provide various advantages or potential advantages when deployed in the network-side instantiations of the radio access network (RAN) stack (e.g., in eNBs, gNBs, or the like). For example, various example embodiments of application-based queue management, including embodiments of T-SFQ, may provide various advantages or potential advantages when embedded in the RAN stack of various types of mobile devices (e.g., 4G, 5G, or the like). For example, various example embodiments of application-based queue management, including embodiments of T-SFQ, may provide various advantages or potential advantages when deployed in the networking stack of mobile devices (e.g., as a Linux queue discipline (qdisc) in the traffic control (tc) module of the Linux kernel or in other implementations of the networking stack of mobile devices), such as for support of various applications like augmented reality and interactive applications that are centered around real-time media streaming. For example, various example embodiments of application-based queue management, including embodiments of T-SFQ, may provide various advantages or potential advantages when deployed in hardware-based or virtualized datacenter switches, where SFQ may be used to handle datacenter problems such as TCP incast and the poor coexistence of small and large data flows ("mice and elephants"), by supporting better treatment of individual applications, enabling flow queuing support in the switch without sharply increasing the size of the overall buffer memory (which is a contributor to the total cost of a switch), and so forth. It will be appreciated that embodiments of application-based queue management do not need to be deployed at every network link in order to be effective or provide benefits; rather, various applications can start benefiting from embodiments of application-based queue management as soon as embodiments of application-based queue management are deployed in at least one link along their network data path.

Various example embodiments for supporting application-based queue management may be configured to support application-based customization of queue management, including congestion control, in various other ways.

It will be appreciated that, although primarily presented herein within the context of embodiments in which the application-based queue management that is performed based on use of trigger templates is application-based congestion control, various other types of application-based queue management may be performed based on use of trigger templates.

Figure 13:
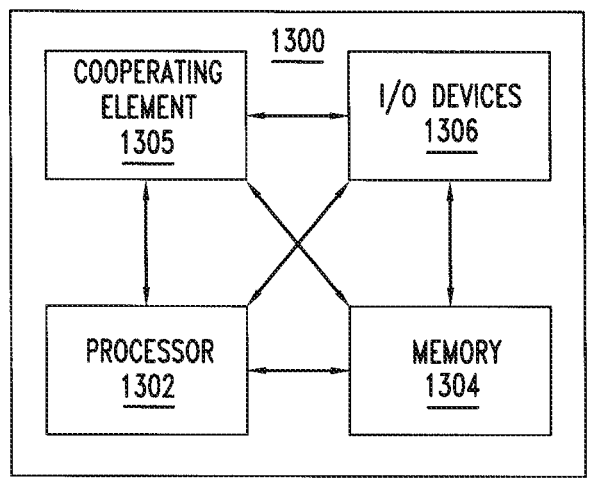
FIG. 13 depicts an example embodiment of a computer suitable for use in performing various functions presented herein.

FIG. 13 depicts an example embodiment of a computer suitable for use in performing various functions presented herein.

The computer 1300 includes a processor 1302 (e.g., a central processing unit, a processor, a processor having a set of processor cores, a processor core of a processor, or the like) and a memory 1304 (e.g., a random access memory, a read only memory, or the like). The processor 1302 and the memory 1304 may be communicatively connected. In at least some embodiments, the computer 1300 may include at least one processor and at least one memory including computer program code, wherein the at least one memory and the computer program code are configured to, with the at least one processor, cause the computer to perform various functions presented herein.

The computer 1300 also may include a cooperating element 1305. The cooperating element 1305 may be a hardware device. The cooperating element 1305 may be a process that can be loaded into the memory 1304 and executed by the processor 1302 to implement various functions presented herein (in which case, for example, the cooperating element 1305 (including associated data structures) can be stored on a non-transitory computer-readable storage medium, such as a storage device or other suitable type of storage element (e.g., a magnetic drive, an optical drive, or the like)).

The computer 1300 also may include one or more input/output devices 1306. The input/output devices 1306 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 1300 may represent a general architecture and functionality suitable for implementing functional elements described herein, portions of functional elements described herein, or the like, as well as various combinations thereof. For example, computer 1300 may provide a general architecture and functionality that is suitable for implementing one or more elements presented herein, such as the communication device 100 or a portion thereof, the link buffer 200 or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various example embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions that, when executed by the at least one processor, cause the apparatus to at least:
      maintain, for a packet handler of a class queue of a link buffer, a trigger template including a congestion control condition and a congestion control action associated with the congestion control condition, wherein the congestion control action of the trigger template includes an indication of a type of congestion control signaling to be performed;
      identify, for a packet associated with a flow queue of the class queue, the trigger template;
      perform an evaluation of the congestion control condition of the trigger template; and
      determine, based on the evaluation of the congestion control condition of the trigger template, whether to initiate the congestion control action of the trigger template.

2. The apparatus of claim 1, wherein the trigger template is associated with an application type or an application.

3. The apparatus of claim 1, wherein the trigger template is identified from a set of trigger templates based on the packet.

4. The apparatus of claim 3, wherein the trigger template is identified from the set of trigger templates based on one or more header fields of the packet.

5. The apparatus of claim 3, wherein the set of trigger templates includes a default trigger template to be applied for packets that do not match any other trigger template in the set of trigger templates.

6. The apparatus of claim 1, wherein the trigger template is identified based on storage of the packet in the flow queue in conjunction with arrival of the packet to the link buffer.

7. The apparatus of claim 1, wherein the trigger template is identified based on removal of the packet from the flow queue by a flow scheduler of the link buffer.

8. The apparatus of claim 1, wherein the trigger template is identified by the packet handler of the class queue of the link buffer.

9. The apparatus of claim 1, wherein the congestion control action of the trigger template is based on at least one of information from the packet or state information from the flow queue.

10. The apparatus of claim 1, wherein the congestion control action of the trigger template includes one or more of dropping the packet, initiating in-band congestion control signaling, initiating out-of-band congestion control signaling, or modifying one or more state indicators of one or more flow queues.

11. The apparatus of claim 1, wherein the congestion control condition of the trigger template is evaluated based on information from the packet.

12. The apparatus of claim 1, wherein the congestion control condition of the trigger template is evaluated based on state information received from the flow queue.

13. The apparatus of claim 12, wherein the trigger template is identified based on storage of the packet in the flow queue in conjunction with arrival of the packet to the link buffer, wherein the state information received from the flow queue includes a queue length of the flow queue.

14. The apparatus of claim 12, wherein the trigger template is identified based on removal of the packet from the flow queue by a flow scheduler of the link buffer, wherein the state information received from the flow queue includes a queuing latency of the flow queue.

15. The apparatus of claim 1, wherein the packet handler comprises an input packet handler configured to send packets to a set of flow queues of the class queue.

16. The apparatus of claim 1, wherein the packet handler comprises an output packet handler configured to receive packets from a set of flow queues of the class queue.

17. An apparatus, comprising:
   at least one processor; and
   at least one memory storing instructions that, when executed by the at least one processor, cause the apparatus to at least:
      identify, for a packet associated with a flow queue of a link buffer, a trigger template configured to support application-based congestion control at the link buffer;
      determine, based on the trigger template, whether to perform application-based congestion control for the flow queue of the link buffer; and
      update the trigger template based on a management interface between a management element and a packet handler configured to control application of the trigger template to packets based on queuing of the packets at the link buffer.

18. A method, comprising:
   maintaining, for a packet handler of a class queue of a link buffer, a trigger template including a congestion control condition and a congestion control action associated with the congestion control condition, wherein the congestion control action of the trigger template includes an indication of a type of congestion control signaling to be performed;
   identifying, for a packet associated with a flow queue of the class queue, the trigger template;
   performing an evaluation of the congestion control condition of the trigger template; and
   determining, based on the evaluation of the congestion control condition of the trigger template, whether to initiate the congestion control action of the trigger template.

* * * * *